US007783967B1

(12) United States Patent  
Carnell et al.

(10) Patent No.: US 7,783,967 B1  
(45) Date of Patent: Aug. 24, 2010

(54) PACKAGING WEB CONTENT FOR REUSE

(75) Inventors: Shawn Carnell, Berryville, VA (US); Joseph Dzikiewicz, Alexandria, VA (US); Kevin Lawver, Sterling, VA (US); Paul Maneesilasan, Lansdowne, VA (US)

(73) Assignee: AOL Inc., Dulles, VA (US)

( * ) Notice: Subject to any disclaimer, the term of this patent is extended or adjusted under 35 U.S.C. 154(b) by 945 days.

(21) Appl. No.: 11/554,449

(22) Filed: Oct. 30, 2006

Related U.S. Application Data

(60) Provisional application No. 60/730,869, filed on Oct. 28, 2005.

(51) Int. Cl.  
*G06F 17/30* (2006.01)

(52) U.S. Cl. ..................................................... 715/234

(58) Field of Classification Search .................. 715/234  
See application file for complete search history.

(56) References Cited

U.S. PATENT DOCUMENTS

| | | | | |
|---|---|---|---|---|
| 6,957,416 | B2 * | 10/2005 | Adams | 717/107 |
| 7,171,614 | B2 * | 1/2007 | Allor | 715/205 |
| 7,240,067 | B2 * | 7/2007 | Timmons | 1/1 |
| 7,546,375 | B2 * | 6/2009 | Tantek et al. | 709/231 |
| 2006/0253411 | A1 * | 11/2006 | Roy-Chowdhury et al. | 707/1 |
| 2006/0290709 | A1 * | 12/2006 | Omi et al. | 345/594 |

OTHER PUBLICATIONS

Oscar Diaz, Juan J. Rodriguez, Portlets as Web Components: an Introduction, Apr. 28, 2004, Journal of Universal Computer Science, vol. 10, No. 4 (2004), 454-472.*  
Tantek Celik, The Elements of Meaningful XHTML, Mar. 13, 2005, microformats.org.*  
Eric A. Meyer, Competent Classing, Jul. 18, 2004, meyerweb.com.*  
Marlon Pierce, Geoffrey Fox, Choonhan Youn, Steve Mock, Kurt Mueller, Ozgur Balsoy, Interoperable Web Services for Computational Portals, 2002, IEEE, Proceedings of the IEEE/ACM SC2002 Conference.*  
Oscar Diaz, Jon Iturrioz, Arantza Irastorza, Improving Portlet Interoperability through Deep Annotation, May 2005, IW3C2.*  
Inaki Paz, Oscar Diaz, Robert Baumgartner, Sergio F. Anzuola, Semantically Integrating Portlets in Portals Through Annotation, 2006.*  
Kropp et al., Web Services for Remote Portlets Specification, Ver 1.0, Sep. 3, 2003, oasis-open.org.*

* cited by examiner

*Primary Examiner*—Stephen S Hong  
*Assistant Examiner*—I-Chan Yang  
(74) *Attorney, Agent, or Firm*—Finnegan, Henderson, Farabow, Garrett & Dunner, LLP

(57) ABSTRACT

A request to import web content that is packaged within a module manifest into a web page is received. In response to receiving the request to import the web content into the web page, the module manifest is accessed. A view container that includes the web content is identified within the accessed module manifest. The view container is a standard XHTML structural element that has a class attribute that designates the standard XHTML structural element as the view container. The web content is extracted from the view container and embedded in the web page.

24 Claims, 19 Drawing Sheets

```
400

<!DOCTYPE html PUBLIC "-//W3C//DTD XHTML 1.0 Transitional//EN" "http://www.w3.org/TR/xhtml1/DTD/
xhtml1-transitional.dtd">
<html lang="en" xmlns="http://www.w3.org/1999/xhtml">
<head profile="http://iamalpha.com/.developer/profile">
    <title>Supercool Module</title>
    <link rel="stylesheet" type="text/css" id="manifest" href="http://imakealpha/.developer/css/
manifest.css"/>
</head>

<body class="module" id="supercool">
<h1>Supercool: Version <span class="version">1.0</span></h1>  } 406

<div class="view supercool">
404(a) { <div class="head"><h3>Supercool Module</h3></div>
404(b){ <div class="body">This is a very cool module indeed, because I wrote it. You will
        view it, and you will like it.</div>                                              } 404
</div>                                                                                    } 408

<h3>Description</h3>
<p class="description">My Supercool Module is a proof of concept to show the world that I
can create a module. As you can see, I've proved the concept successfully.</p>

<h3>Detail</h3>
<p class="detail">I could go on and on about how awesome I am, but I'll spare you.</p>   } 410

<h3>Author Information</h3>
<ul>
    <li class="author vcard">
        <a href="mailto:johnsmith@aol.com" class="email fn"> John Smith </a> -            } 412
        <a href="http://johnsmith.com" class="url">My Homepage</a>
    </li>
</ul>

<h3>License</h3>
<p><a href="http://licenseurlgoeshere" rel="license">Licensed under X</a>. </p>           } 414
</body>
</html>
```

Figure 5A:
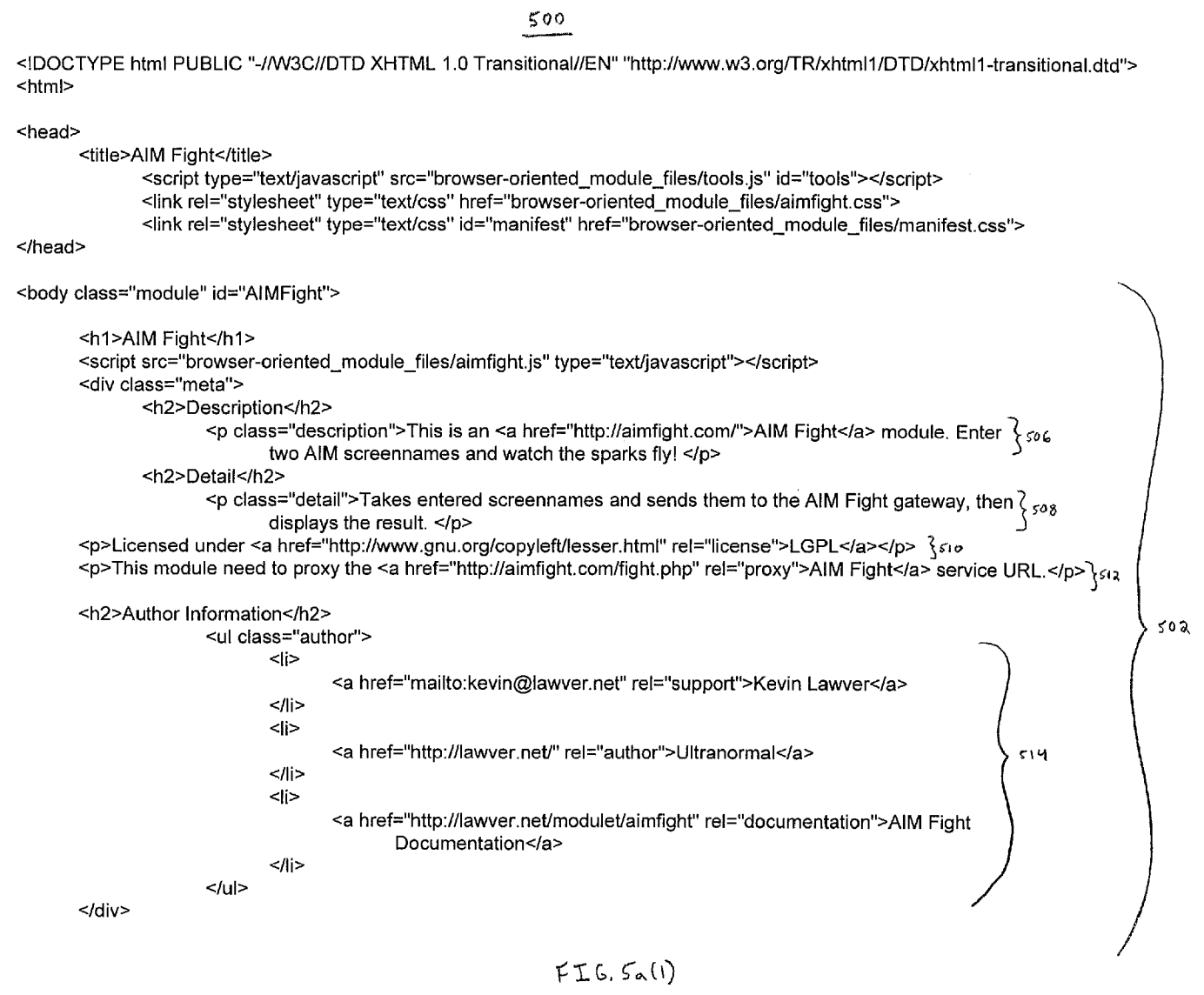

```
<!DOCTYPE html PUBLIC "-//W3C//DTD XHTML 1.0 Transitional//EN" "http://www.w3.org/TR/xhtml1/DTD/xhtml1-transitional.dtd">
<html>
<head>
    <title>AIM Fight</title>
    <script type="text/javascript" src="browser-oriented_module_files/tools.js" id="tools"></script>
    <link rel="stylesheet" type="text/css" href="browser-oriented_module_files/aimfight.css">
    <link rel="stylesheet" type="text/css" id="manifest" href="browser-oriented_module_files/manifest.css">
</head>
<body class="module" id="AIMFight">
    <h1>AIM Fight</h1>
    <script src="browser-oriented_module_files/aimfight.js" type="text/javascript"></script>
    <div class="meta">
        <h2>Description</h2>
        <p class="description">This is an <a href="http://aimfight.com/">AIM Fight</a> module. Enter two AIM screennames and watch the sparks fly! </p>
        <h2>Detail</h2>
        <p class="detail">Takes entered screennames and sends them to the AIM Fight gateway, then displays the result. </p>
        <p>Licensed under <a href="http://www.gnu.org/copyleft/lesser.html" rel="license">LGPL</a></p>
        <p>This module need to proxy the <a href="http://aimfight.com/fight.php" rel="proxy">AIM Fight</a> service URL. </p>
        <h2>Author Information</h2>
        <ul class="author">
            <li>
                <a href="mailto:kevin@lawver.net" rel="support">Kevin Lawver</a>
            </li>
            <li>
                <a href="http://lawver.net/" rel="author">Ultranormal</a>
            </li>
            <li>
                <a href="http://lawver.net/module/aimfight" rel="documentation">AIM Fight Documentation</a>
            </li>
        </ul>
    </div>
```

<h2>Module View</h2>

<div class="view AIMFight">
 504(a) { <h3 class="head">AIM Fight!!</h3>
 <div class="body">
  <form action="javascript:aimfight();"> } 516
   <ul>
    <li>
     <label>Screenname One: <input name="name1" type="text"></label>
    </li>
    <li>
     <label>Screenname Two: <input name="name2" type="text"></label>
    </li>
    <li>
     <input value="fight!" type="submit">
    </li>
   </ul>
   <div class="results"></div>
  </form>
 </div>
</div>
</body>
</html>

AIM Fight!!

540

- Screenname One: [        ]
- Screenname Two: [        ]
- [fight!]

FIG. 5c

```
<!DOCTYPE html PUBLIC "-//W3C//DTD XHTML 1.0 Transitional//EN" "http://www.w3.org/TR/xhtml1/DTD/xhtml1-transitional.dtd">
<html>
<head>
    <title>AIM Fight</title>
    <link rel="stylesheet" type="text/css" href="browser-oriented_module_files/aimfight.css">
    <link rel="stylesheet" type="text/css" id="manifest" href="browser-oriented_module_files/manifest.css">
    <script src="browser-oriented_module_files/aimfight.js" type="text/javascript"></script>
</head>
<body>
<h3>AIM Fight!</h3>
    <form action="javascript:aimfight();">
        <ul>
            <li>
                <label>Screenname One: <input name="name1" type="text"></label>
            </li>
            <li>
                <label>Screenname Two: <input name="name2" type="text"></label>
            </li>
            <li>
                <input value="fight!" type="submit">
            </li>
        </ul>
        <div class="results"></div>
    </form>
</body>
</html>
```

FIG. 5D

```
<!DOCTYPE html PUBLIC "-//W3C//DTD XHTML 1.0 Transitional//EN" "http://www.w3.org/TR/xhtml1/DTD/xhtml1-transitional.dtd">
<html>
<head>
    <title>AIM Fight</title>
    <link rel="stylesheet" type="text/css" href="browser-oriented_module_files/aimfight.css">
    <link rel="stylesheet" type="text/css" id="manifest" href="browser-oriented_module_files/manifest.css">
    <script src="browser-oriented_module_files/aimfight.js" type="text/javascript"></script>
</head>
<body>
    <div class="view AIMFight">
        <h3 class="head">AIM Fight!</h3>
        <div class="body">
            <form action="javascript:aimfight();">
                <ul>
                    <li>
                        <li><label>Screenname One: <input name="name1" type="text"></label>
                        <li><label>Screenname Two: <input name="name2" type="text"></label>
                        <li>
                        <li><input value="fight!" type="submit">
                </ul>
                <div class="results"></div>
            </form>
        </div>
    </div>
</body>
</html>
```

PACKAGING WEB CONTENT FOR REUSE

CLAIM OF PRIORITY

This application claims priority under 35 U.S.C. §119(e) to U.S. Patent Application Ser. No. 60/730,869, entitled "Packaging Web Content for Reuse," filed on Oct. 28, 2005, the entire contents of which are hereby incorporated by reference.

TECHNICAL FIELD

This disclosure relates to packaging web content for reuse.

BACKGROUND

Web content typically is defined by markup language, for example hypertext markup language (HTML) or extensible HTML (XHTML) and associated styles, scripts, and meta-data which are embedded within a markup language document that can be rendered in a web browser.

Microformat specifications allow semantics to be applied to markup language documents such as, for example, HTML or XHTML documents, by adding additional microformat markup to the preexisting markup documents. A machine that supports a particular microformat specification can extract meaning from a document that includes microformat markup that complies with the microformat specification by interpreting the additional microformat markup that has been added to the document.

SUMMARY

In one aspect, a request to import web content that is packaged within a module manifest into a web page is received. In response to receiving the request to import the web content into the web page, the module manifest is accessed. A view container that includes the web content is identified within the accessed module manifest. The view container is a standard XHTML structural element that has a class attribute that designates the standard XHTML structural element as the view container. The web content is extracted from the view container and embedded in the web page.

Implementations may include one or more of the following features. For example, a module container may be identified within the module manifest. The module container may be another standard XHTML structural element that has another class attribute that designates the other standard XHTML structural element as the module container. Identifying the module container may include determining that the other standard XHTML structural element is the module container based on recognizing that the other class attribute designates the other standard XHTML structural element as the module container.

The other standard XHTML structural element may have an identification attribute that specifies a name, and identifying the module container may include associating the name specified by the identification attribute with the web content.

Identifying the view container may include determining that the standard XHTML structural element is the view container based on recognizing that the class attribute designates the standard XHTML structural element as the view container.

In addition, the XHTML-based module manifest may be rendered in a web browser.

In another aspect, a microformat specification that extends the meaning of standard XHTML elements may be used to package web content for reuse in an XHTML-based module manifest. A markup element of the module manifest is designated as a view container by assigning a class attribute of the markup element a value that, according to the microformat specification, identifies the markup element as belonging to a view container class. In addition, the web content is enclosed within the view container.

Implementations may include one or more of the following features. Another markup element of the module manifest may be designated as a module container by assigning a class attribute of the other markup element a value that, according to the microformat specification, identifies the other markup element as belonging to a module container class and by assigning an identification attribute of the other markup element a value that associates the web content with a name. The view container may be enclosed within the module container.

Another markup element enclosed within the module container may be designated as a description meta-data element for containing a description of the web content by assigning a class attribute of the other markup element a value that, according to the microformat specification, identifies the other markup element as the description meta-data element. A different markup element enclosed within the module container may be designated as a detail meta-data element for containing another description of the web content that is more detailed than the description of the web content contained within the description meta-data element by assigning a class attribute of the different markup element a value that, according to the microformat specification, identifies the other markup element as the detail meta-data element.

Another markup element enclosed within the module container may be designated as an author meta-data element for containing information about an author of the web content element by assigning a class attribute of the other markup element a value that, according to the microformat specification, identifies the other markup element as the author meta-data element.

Another markup element enclosed within the module container may be identified as a thumbnail meta-data element for containing a reference to a visual representation associated with the web content by assigning a class attribute of the other markup element a value that, according to the microformat specification, identifies the other markup element as the thumbnail meta-data element.

Another markup element enclosed within the module container may be designated as a version meta-data element for containing information related to a version of the web content by assigning a class attribute of the other markup element a value that, according to the microformat specification, identifies the other markup element as the version meta-data element.

A target document referenced by a markup element that is enclosed within the module container may be designated as a document that provides documentation about the web content by associating an attribute with the target document that, according to the microformat specification, identifies the target document as the document that provides documentation about the web content.

A target document referenced by a markup element that is enclosed within the module container may be designated as a document that provides information about a license associated with the web content by associating an attribute with the target document that, according to the microformat specification, identifies the target document as the document that provides information about the license associated with the web content.

A target document referenced by a markup element that is enclosed within the module container may be designated as a document that an importer needs to proxy by associating an attribute with the target document that, according to the microformat specification, identifies the target document as the document that the importer needs to proxy.

Another markup element enclosed within the module container may be designated as a module properties list for defining at least one property of the web content by assigning a class attribute of the other markup element a value that, according to the microformat specification, identifies the other markup element as the module properties meta-data element.

Another markup element enclosed within the module container may be designated as an edit container for defining an edit interface that enables a user to configure the web content by assigning a class attribute of the other markup element a value that, according to the microformat specification, identifies the other markup element as belonging to an edit container class.

In another aspect, an importation engine is configured to receive a request to import web content that has been packaged within a module manifest into a web page and to access the module manifest in response to receiving the request to import the web content into the web page. In addition, the importation engine is configured to identify within the accessed module manifest a view container that includes the web content. The view container is a standard XHTML structural element that has a class attribute that designates the standard XHTML structural element as the view container. The importation engine is further configured to extract the web content from the view container and to embed the web content in the web page.

Implementations may include one or more of the following features. For example, the importation engine may be configured to identify, within the module manifest, a module container. The module container may be another standard XHTML structural element that has another class attribute that designates the other standard XHTML structural element as the module container. The importation engine also may be configured to render the XHTML-based module manifest.

Implementations of any of the techniques described may include a method or process, an apparatus or system, or a computer program embodied on a computer readable medium. The details of one or more implementations are set forth in the accompanying drawings and the description below. Other features, objects, and advantages will be apparent from the description and drawings, and from the claims.

DESCRIPTION OF DRAWINGS

FIG. 4 illustrates an example of a complete module manifest for packaging a module of web content for reuse.

FIGS. 5a(1) and 5a(2) illustrate a second example of a complete module manifest for packaging a module of web content for reuse.

FIG. 5c illustrates a screenshot of the actual module of web content after having been extracted from the module manifest of FIGS. 5a(1) and 5a(2) and imported into a new web page.

FIG. 5d illustrates the markup language source document for the web page of FIG. 5c.

FIG. 5e illustrates another implementation of the markup language source document for the web page of FIG. 5c

DETAILED DESCRIPTION

Packaging modules of web content for reuse is disclosed. One or more modules of web content may be packaged for reuse within a document referred to as a module manifest. A module of web content can be packaged within the module manifest by adding additional markup to the content's markup and associated styles, scripts, and meta-data. The additional markup may follow a microformat specification. Subsequently, the module of web content packaged within the module manifest can be extracted from the module manifest for importation into any web page by using the added microformat markup to identify the module from within the module manifest such that it can be extracted from the module manifest.

In particular, a module of web content is packaged within a module manifest such that instances of the module of web content can be embedded within one or more web pages by instantiating the module of web content from the module manifest. That is to say, a module of web content embedded within a module manifest can be extracted from the module manifest and imported into one or more web pages.

In one implementation, a discrete module of web content is packaged in a module manifest that uses microformat tags to identify and describe the content's markup (e.g., HTML or XHTML) and associated styles, scripts, or meta-data that define the module of web content (e.g., JavaScript, cascading style sheets (CSS), etc.). The module manifest then may be made available to web page designers that potentially may be interested in importing an instance of the module of web content into a web page. For example, the module manifest may be added to a hosted collection of module manifests that contains modules of web content that are available to be imported into web pages. In response to an instruction to import the module of web content from the module manifest into a web page, an importation engine can parse the module manifest and use the microformat tags to identify the content's markup and associated styles, scripts, or meta-data that define the module of web content, thereby enabling the importation engine to extract the markup and associated styles, scripts or meta-data from the module manifest and embed an instance of the module of web content in a webpage by embedding the extracted markup and associated styles, scripts, or meta-data.

Figure 1A:
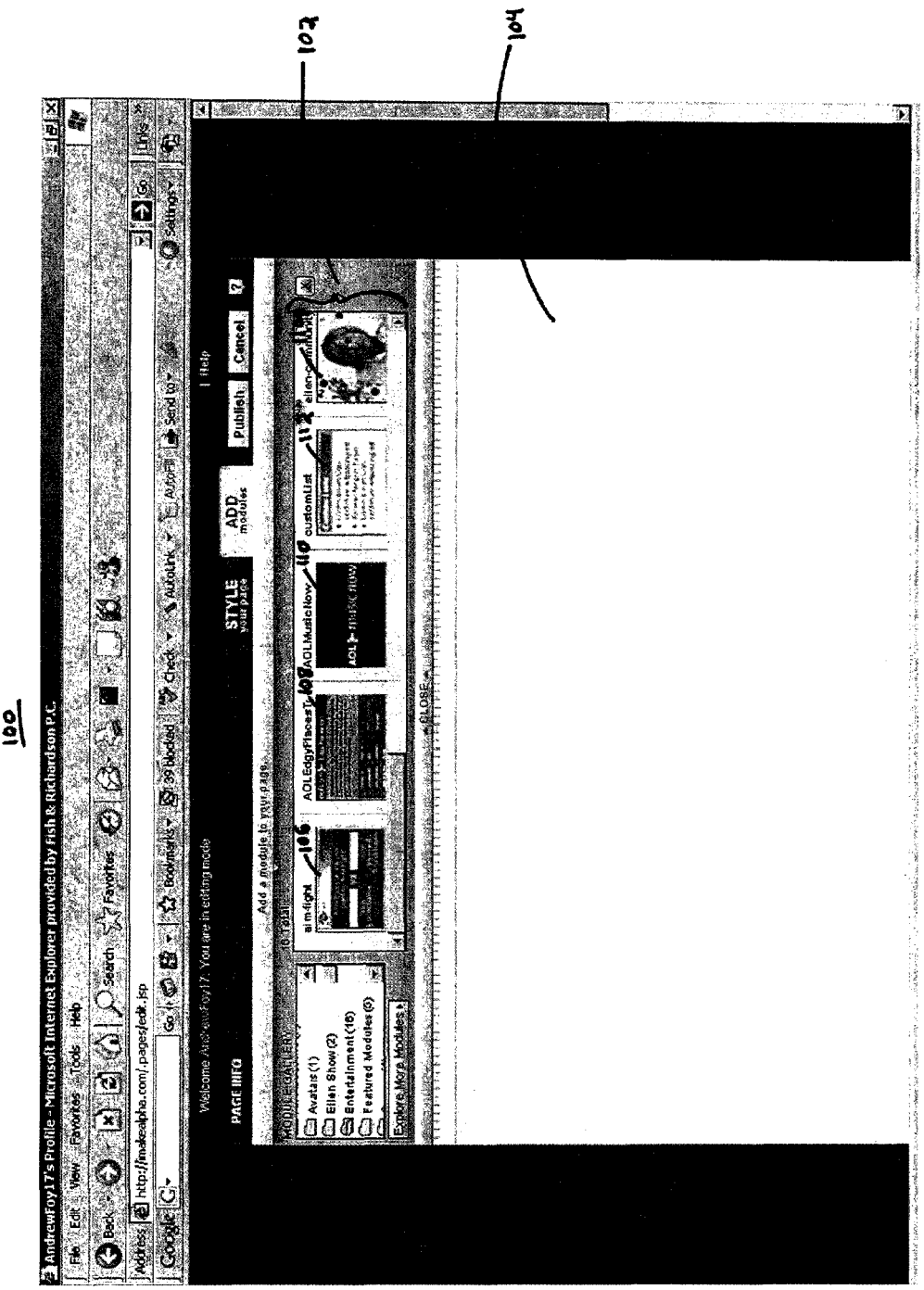
FIGS. 1a-1h illustrate an example of a graphical user interface (GUI) for importing modules of web content into a web page.
Figure 1B:
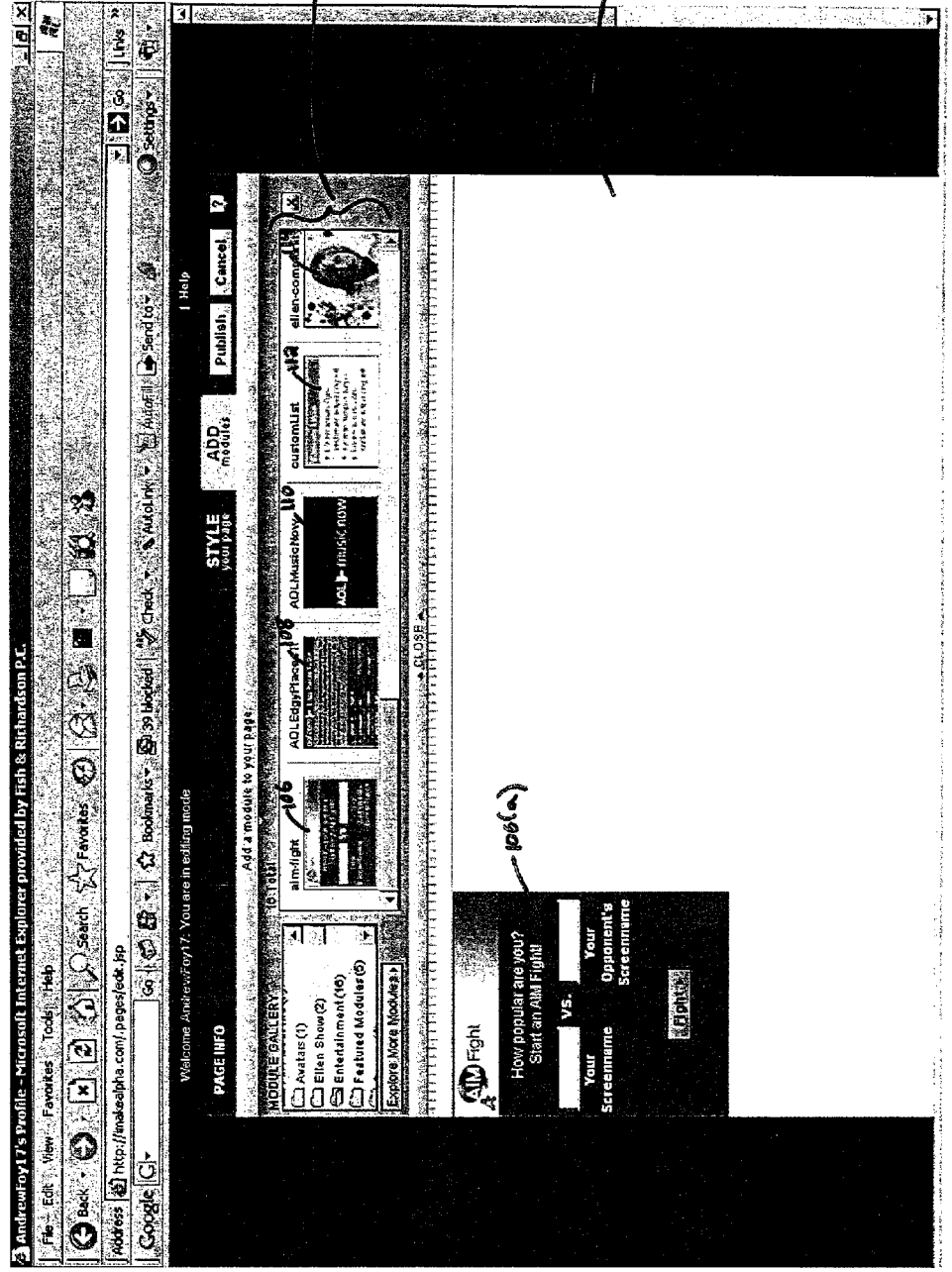
Figure 1C:
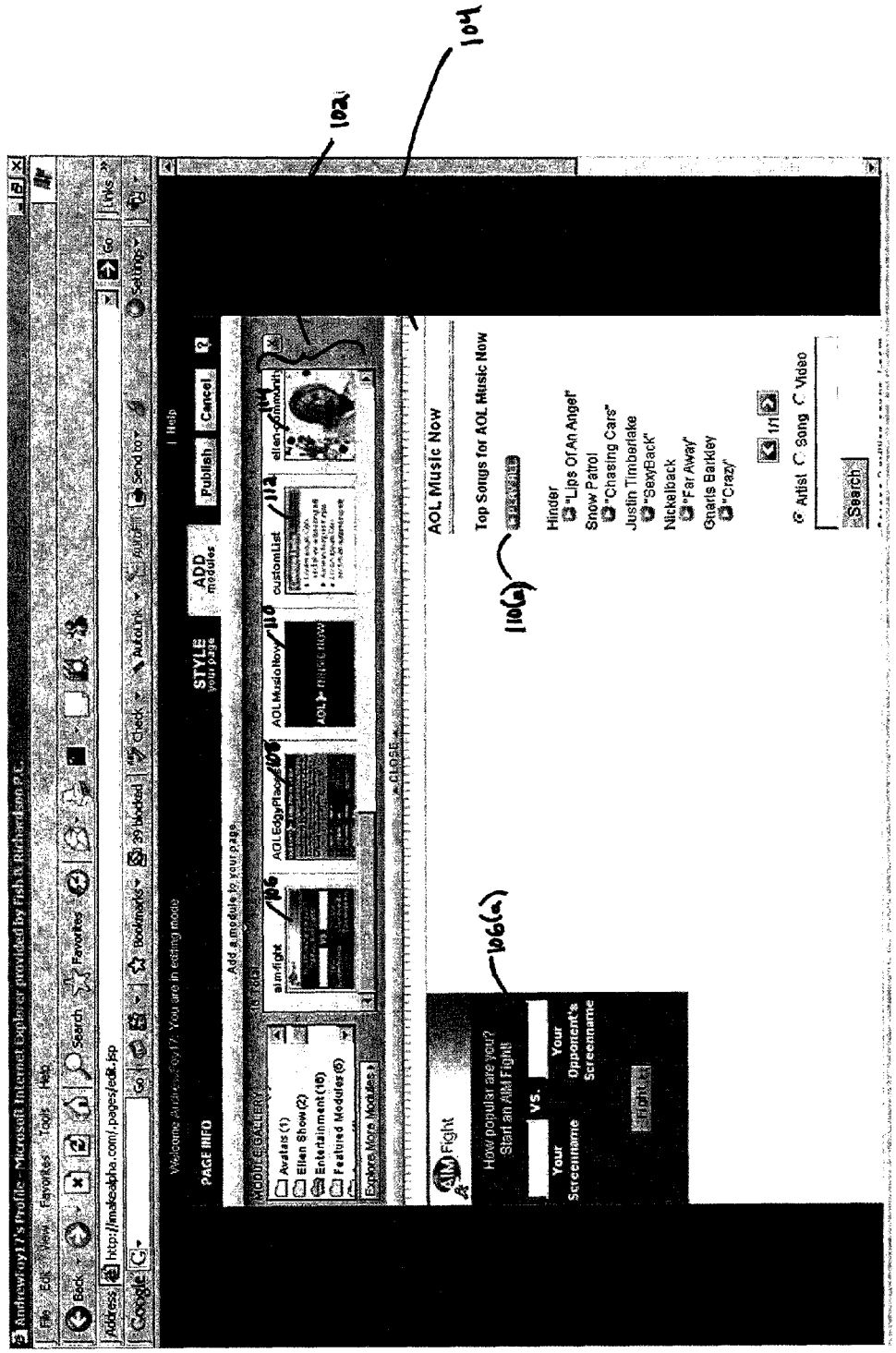

FIGS. 1a-1c illustrate an example of a graphical user interface (GUI) 100 for importing modules of web content into a web page. Referring to FIG. 1a, the GUI 100 includes a menu 102 of modules of web content and a web page publishing interface 104.

The menu 102 includes a collection of visual representations of modules of web content 106, 108, 110, 112, and 114, each of which has been packaged within a corresponding module manifest such that the module of web content can be extracted from the module manifest and imported into a web page.

The web page publishing interface 104 enables a user to compose a web page by importing one or more of the modules of web content 106, 108, 110, 112, and 114 from the menu 102 into the web page. More particularly, a user can import a module of web content into a web page by selecting a module of web content from the menu of modules of web content 102 and then, for example, dragging and dropping the selected module of web content to a desired location within the web page publishing interface 104.

For instance, as illustrated in FIG. 1b, the user can drag and drop module 106 into the web page publishing interface 104 such that an instance 106(a) of the module 106 is imported into the user's web page. The user also can import additional modules of web content into the user's web page. For example, as illustrated in FIG. 1c, the user can drag and drop module 110 into the web page publishing interface 104 such that an instance 110(a) of the module of web content 110 is imported into the user's web page.

Figure 1D:
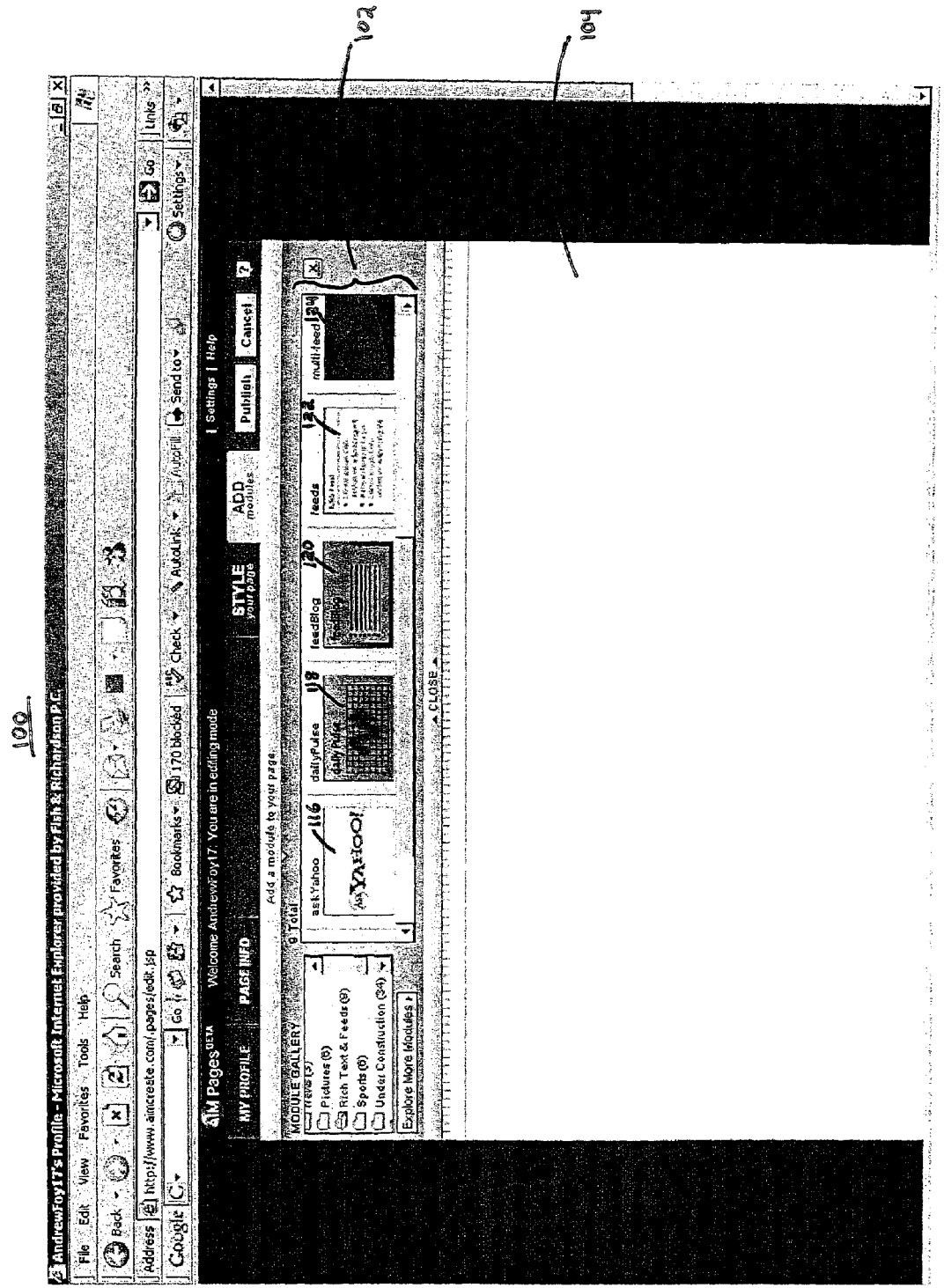
Figure 1E:
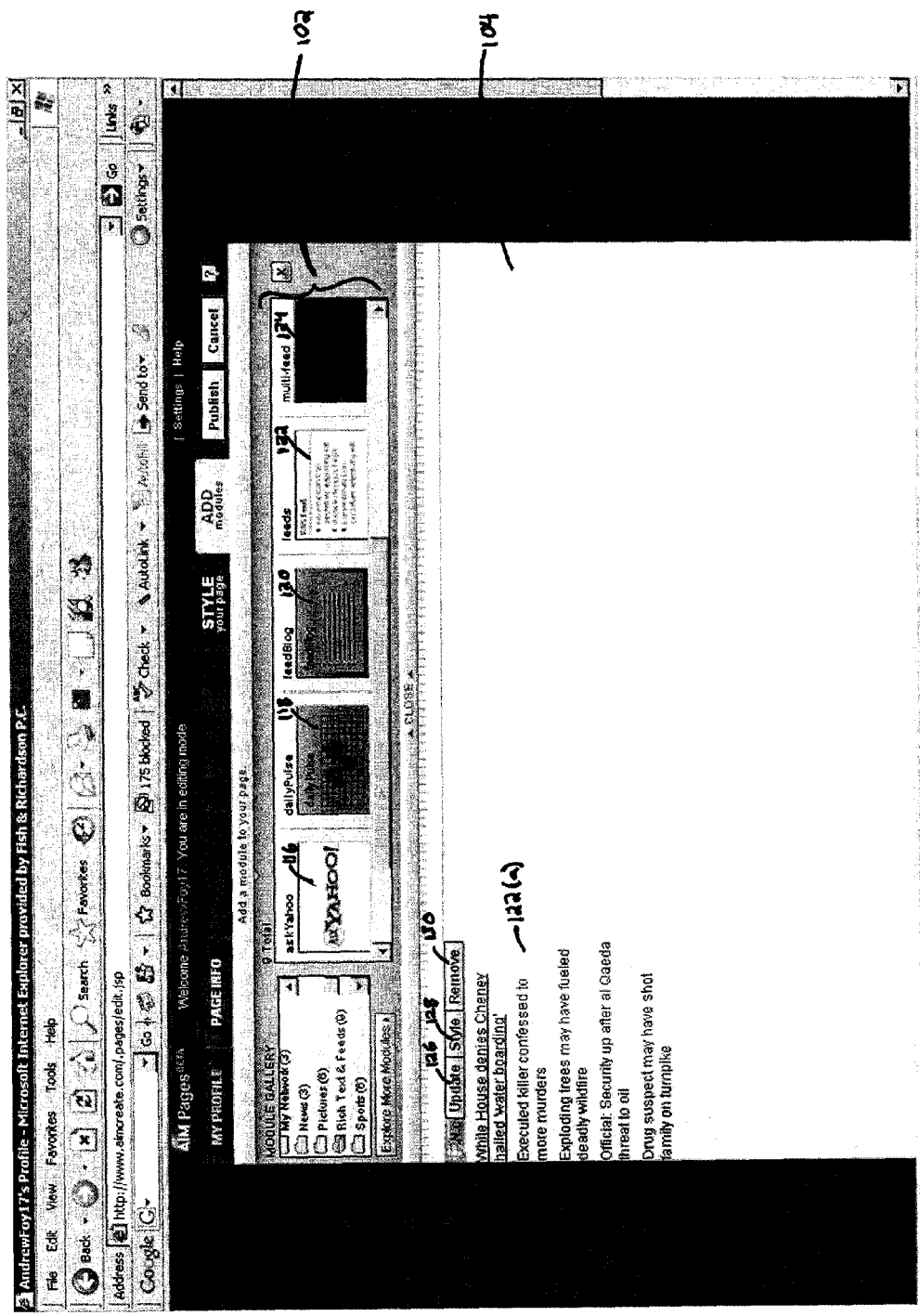

In some implementations, a user may be able to edit or otherwise configure a module of web content before and/or after importing the module of web content into a web page. As illustrated in FIG. 1d, the GUI 100 has been modified such that the menu 102 now includes a collection of visual representations of different modules of web content 116, 118, 120, 122, and 124. Referring to FIG. 1e, when a user drags and drops module 122 into the web page publishing interface 104, an instance 122(a) of module 122 is imported into the web page publishing interface 104. As illustrated in FIG. 1e, the instance 122(a) of the module 122 is configured to publish an RSS feed on the user's web page. After the instance 122(a) of the module has been imported into the web page publishing interface 104, the user is presented with controls 126, 128, and 130 that enable the user to edit or otherwise configure the instance 122(a) of module 122. For example, by selecting the update button 126, the user can edit the instance 122(a) of the module 122, by selecting the style button 128, the user can apply styles to the instance 122(a) of the module 122, and by selecting the remove button 130, the user can remove the instance 122(a) of the module 122.

Figure 1F:
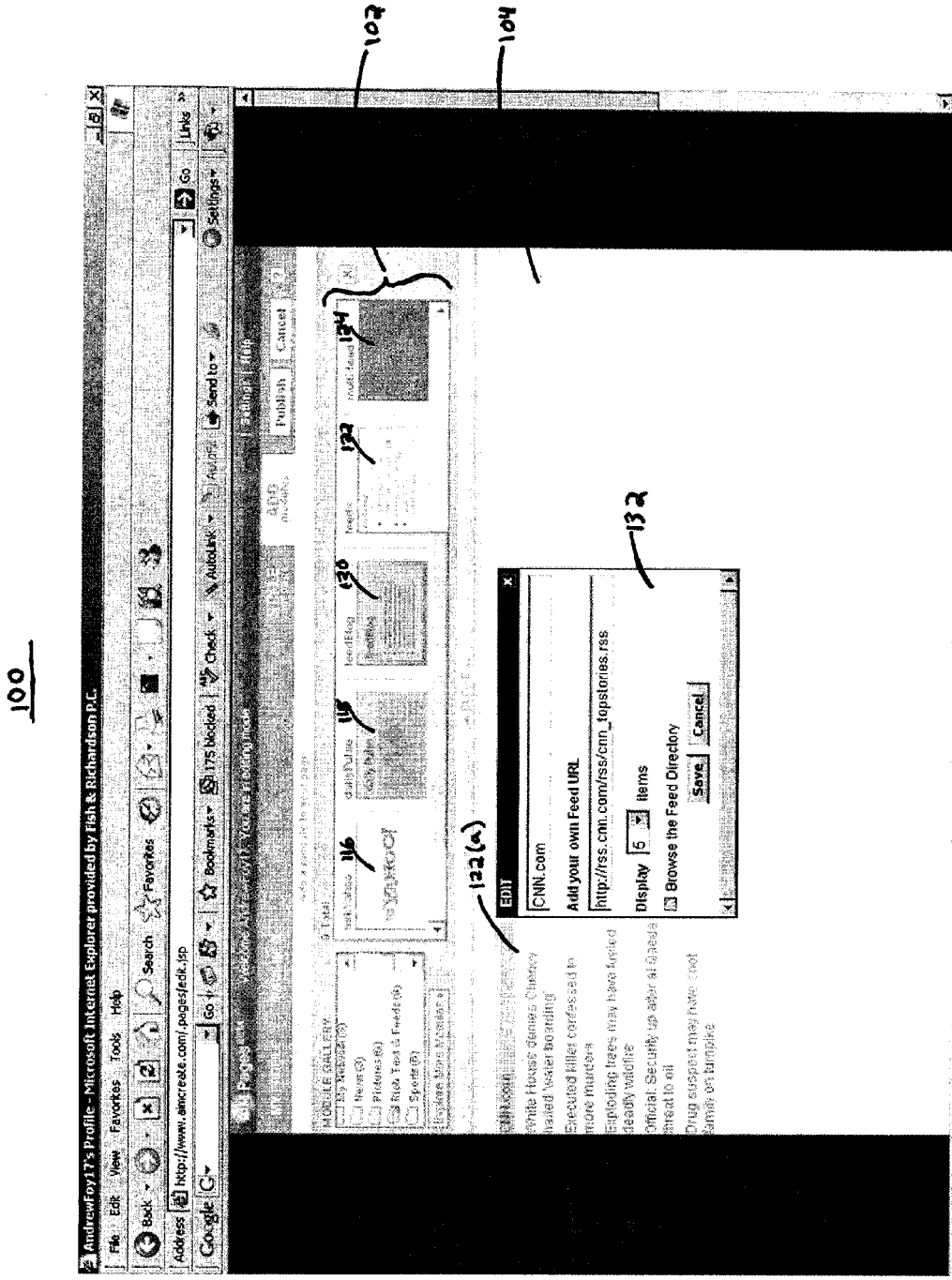

Referring to FIG. 1f, after the user selects the update button 126 of FIG. 1e, an edit interface 132 is surfaced that enables the user to edit or otherwise configure the module. In particular, the edit interface 132 enables the user to specify a particular uniform resource locator (URL) of an RSS feed to be published as well as the number of items from the RSS feed to be published at any given time. For example, referring to FIG. 1g, the user has manipulated the edit interface 132 so as to configure the instance 122(a) of the module 122 to display three items from the RSS feed at any given time. Thereafter, as illustrated in FIG. 1h, the instance 122(a) of the module 122 publishes three items from the RSS feed at any given time. When the user uses the edit interface 132 to edit or otherwise configure the instance 122(a) of the module, the actual markup and/or the data object model (DOM) for the module may be manipulated. Additionally or alternatively, if the edit interface 132 is used to edit or otherwise configure a module of web content prior to or during importation of the module, the importation engine may accomplish the editing and/or configuring by intelligently extracting certain content or information from the module's manifest during importation and/or the importation engine may accomplish the editing and/or configuring by appending certain information or content to a header associated with the module during importation.

The edit interface 132 described above is merely one example of an edit interface. Edit interfaces may take various different forms, and edit interfaces may enable an importer to edit or otherwise configure various different properties, styles, and/or aspects of a module of arbitrary web content.

The web page publishing interface 104 is a visual representation of the user's web page. The user's web page is defined by a markup language source document. The visual representation of the user's web page presented in the web page publishing interface 104 is generated by rendering the markup language source document in a browser. When a user drags and drops a module of web content from the menu 102 into the web page publishing interface 104, the content's markup and associated styles, scripts, and meta-data that define the module of web content are extracted from the corresponding module manifest in which the module has been packaged and imported into the markup language source document that describes the user's resultant web page. That is, the source document that describes the user's web page is modified to include the content's markup and associated styles, scripts, and meta-data.

In some implementations, a JavaScript layout manager application may be configured to implement the dragging and dropping of a module of web content from the menu 102 into the web page publishing interface 104. In such implementations, when a module is dropped into place in the web page publishing interface 104, the framework parses the corresponding module manifest, extract's the module's markup and associated styles, scripts, and meta-data from the module manifest, and embeds the module's markup and associated styles, scripts, and meta-data into the web page. In addition, in such implementations, XML path language (XPath) may be used to insert and remove elements from the target web page's document object model (DOM).

The GUI 100 of FIGS. 1a-1h is merely one example of a GUI that enables users to import modules of web content into web pages. Numerous other GUIs also may be used to enable users to import modules of web content into web pages.

Figure 2A:
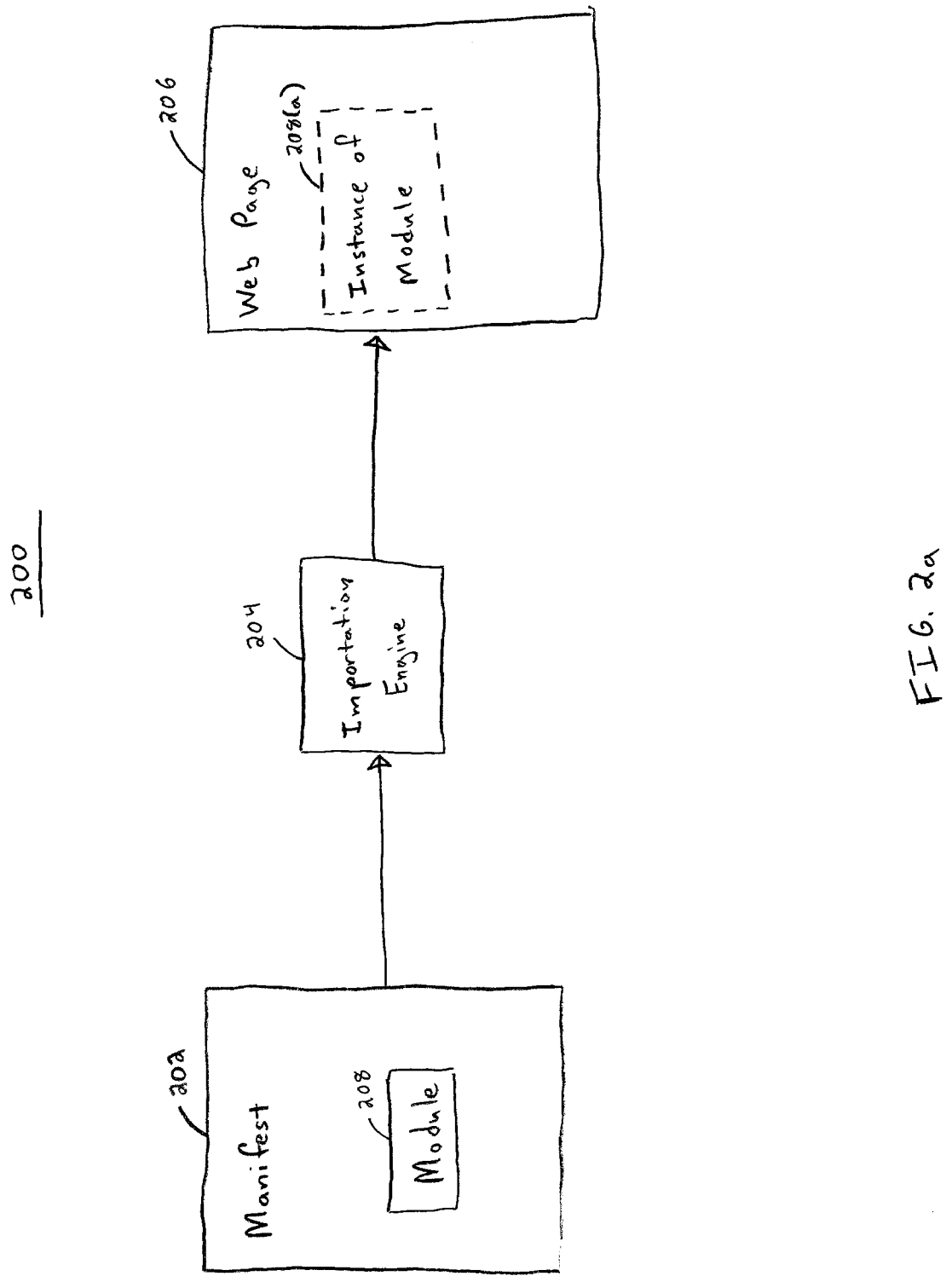
FIG. 2a is a block diagram of an example of an architecture for importing a module of web content from a module manifest into a web page.

FIG. 2a is a block diagram of an example of an architecture 200 for importing a module of web content from a module manifest into a web page. As illustrated in FIG. 2a, the architecture 200 includes a module manifest 202, an importation engine 204, and a web page 206. The module manifest 202 includes a module of web content 208 that has been packaged within the module manifest 202 for reuse. The module of web content is defined by markup language and perhaps additionally one or more associated styles, scripts, meta-data and other data. The markup and associated styles, scripts, and meta-data that define the module of web content 208 have been packaged within the module manifest 202 by adding additional microformat markup to the content's markup and associated styles, scripts, and meta-data. The microformat markup added to the module of web content identifies the relevant portions of the markup and associated styles, scripts, and meta-data that define the module of web content 208 such that the module of web content 208 can be extracted from the module manifest 202 and imported into a web page, while retaining the functionality of the module of web content 208.

The importation engine 204 understands the meaning added to the module of web content 202 by the additional microformat markup. Therefore, the importation engine can parse the module manifest 202 and intelligently identify the module of web content 208 packaged within the module manifest 202 based on the additional microformat markup. After the importation engine has identified the module of web content 208, the importation engine can extract the content's markup and associated styles, scripts, and meta-data from the module manifest and instantiate an instance 208(a) of the module 208 in the web page 206 by embedding the extracted markup and associated styles, scripts, and meta-data within the web page 206.

Figure 2B:
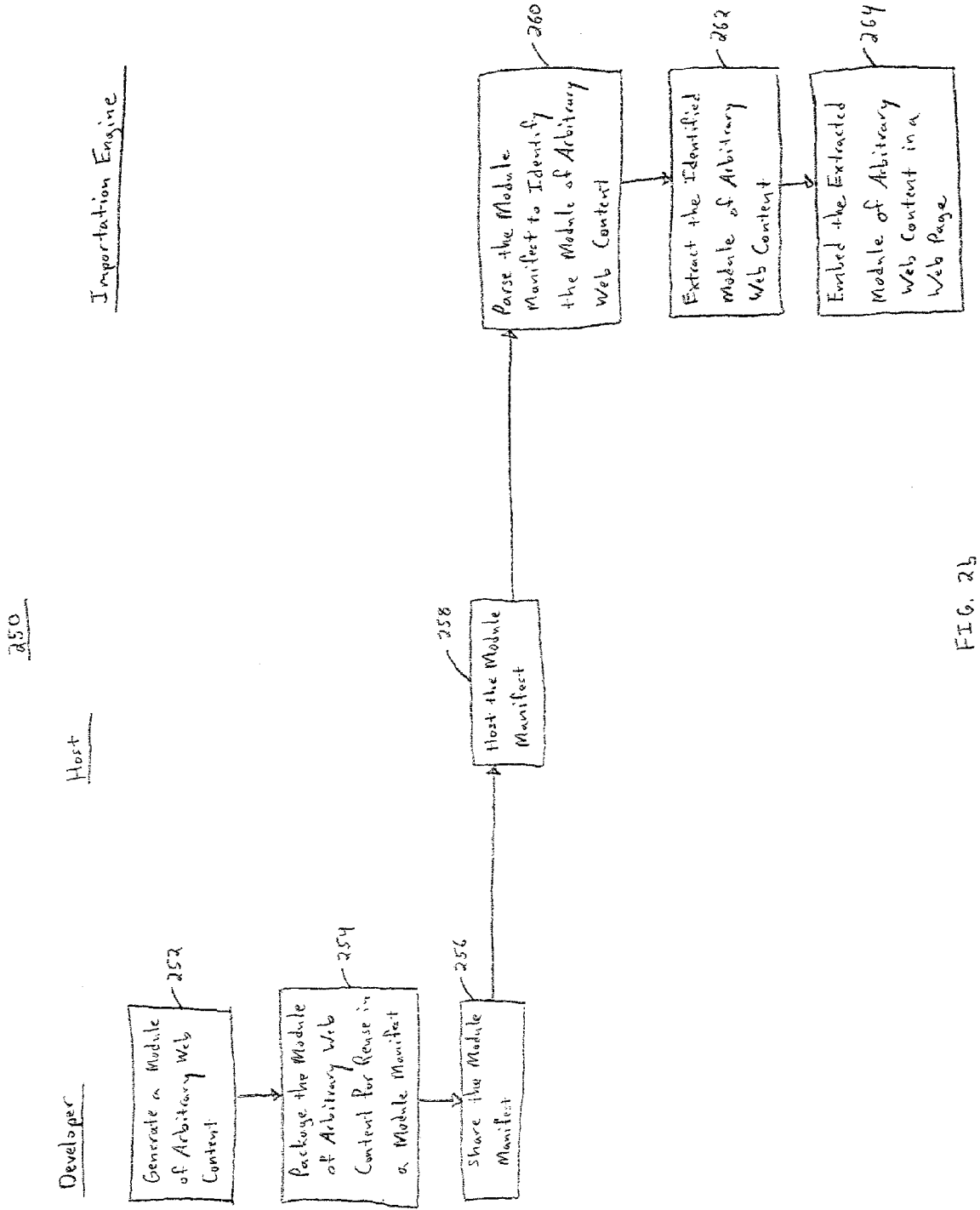
FIG. 2b is a diagram of an example of a process for packaging a module of web content for reuse and importing the module of web content into a web page.

FIG. 2b is a diagram of an example of a process 250 for packaging a module of web content for reuse and importing the module of web content into a web page. The process begins when a developer generates a module of web content (252). Typically the developer will generate the module of web content by creating a markup language document (e.g., an HTML or XHTML document) that includes markup and perhaps one or more associated styles, scripts, meta-data and other data that define the module of web content.

After generating the module of web content, the developer packages the module of web content for reuse within a module manifest by adding additional microformat tags to the content's markup and associated styles, scripts, and meta-data that define the module of web content (254). After packaging the module of web content for reuse within the module manifest, the developer shares the module manifest with web page designers by adding the module manifest to a collection of module manifests stored on a host computer (256). The host computer then makes the module manifest available to the web page designers by hosting the module manifest in its collection of module manifests (258).

In response to receiving a request to import the module of web content into a web page from a web page designer, an importation engine that supports the microformat added to the module of web content parses the module of web content to identify the content's markup and associated styles, scripts, and meta-data that define the module of web content (260). The importation engine identifies the content's markup and associated styles, scripts, and meta-data based on the additional microformat tags added to the module of web content and extracts the identified markup and associated styles, scripts, and meta-data from the module manifest (262). The importation engine then imports the module of web content into the web page by embedding the markup and associated styles, scripts, and meta-data into the markup language source document that defines the web page (264).

Figure 2C:
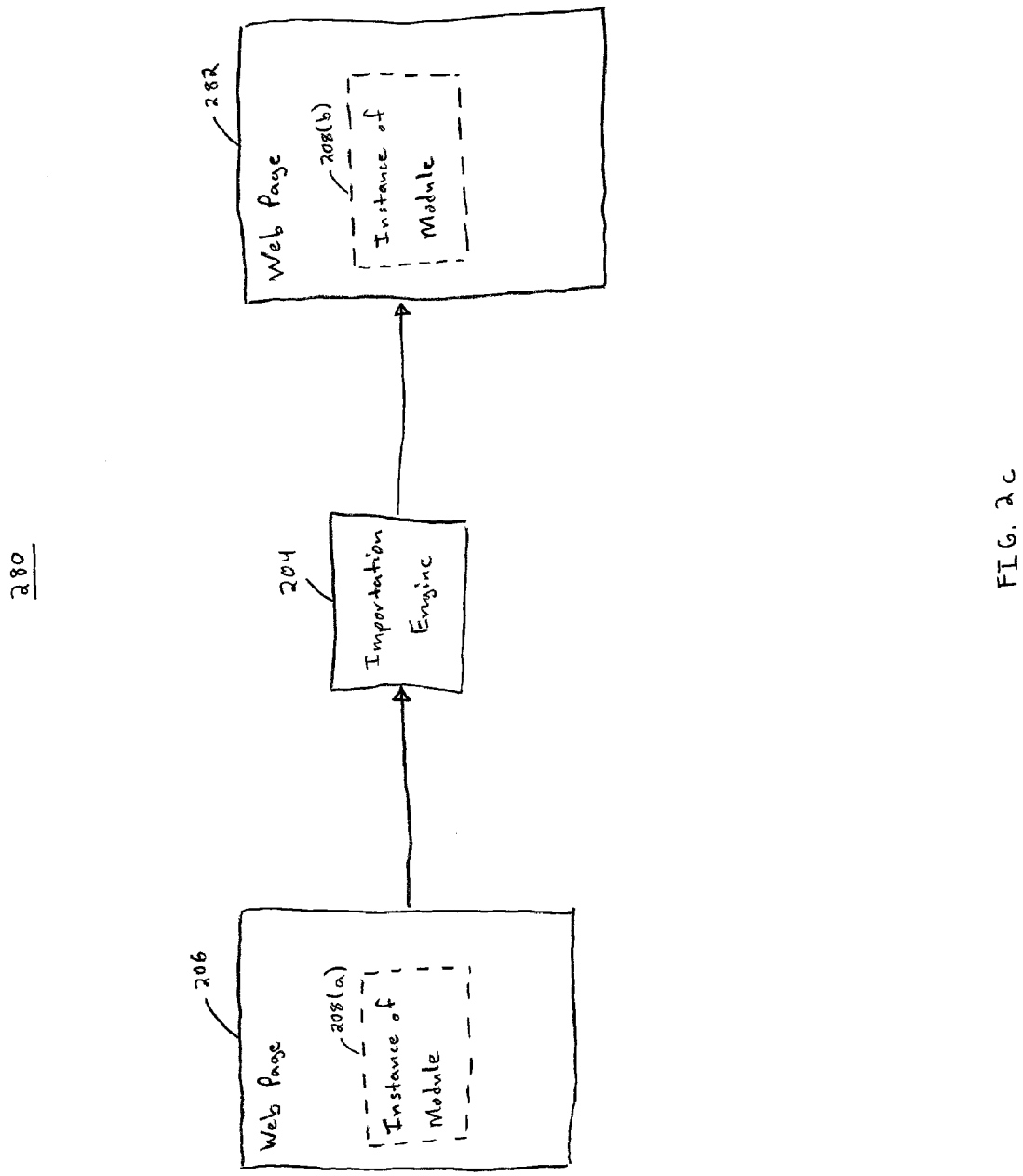
FIG. 2c is a block diagram of an example of an architecture for importing an instance of a module of web content from a web page into another web page.

After an instance of a module of web content has been instantiated in a web page, it may be possible to import the instance of the module from the web page into another web page. FIG. 2c is a block diagram of an example of an architecture 280 for importing the instance 208(a) of the module 208 from the web page 206 of FIG. 2a into a second web page 282. The instance 208(a) of the module 208 is defined by markup language and perhaps additionally one or more associated styles, scripts, meta-data and other data. Enough of the microformat markup added to the module 208 in the module manifest 206 has been retained in the instance 208(a) of the module 208 instantiated in the web page 206 so as to enable the instance 208(a) of the module 208 to be imported into the second web page 282.

The importation engine 204 understands the meaning of the retained microformat markup. Therefore, the importation engine can identify the instance 208(a) of the module 208 within the web page 206. After the importation engine 204 has identified the instance 208(a) of the module 208 within the web page 206, the importation engine 204 can extract the content's markup and associated styles, scripts, and meta-data from the web page 206 and instantiate another instance 208(b) of the module 208 in the second web page 282 by embedding the extracted markup and associated styles, scripts, and meta-data within the second web page 282.

Figure 3:
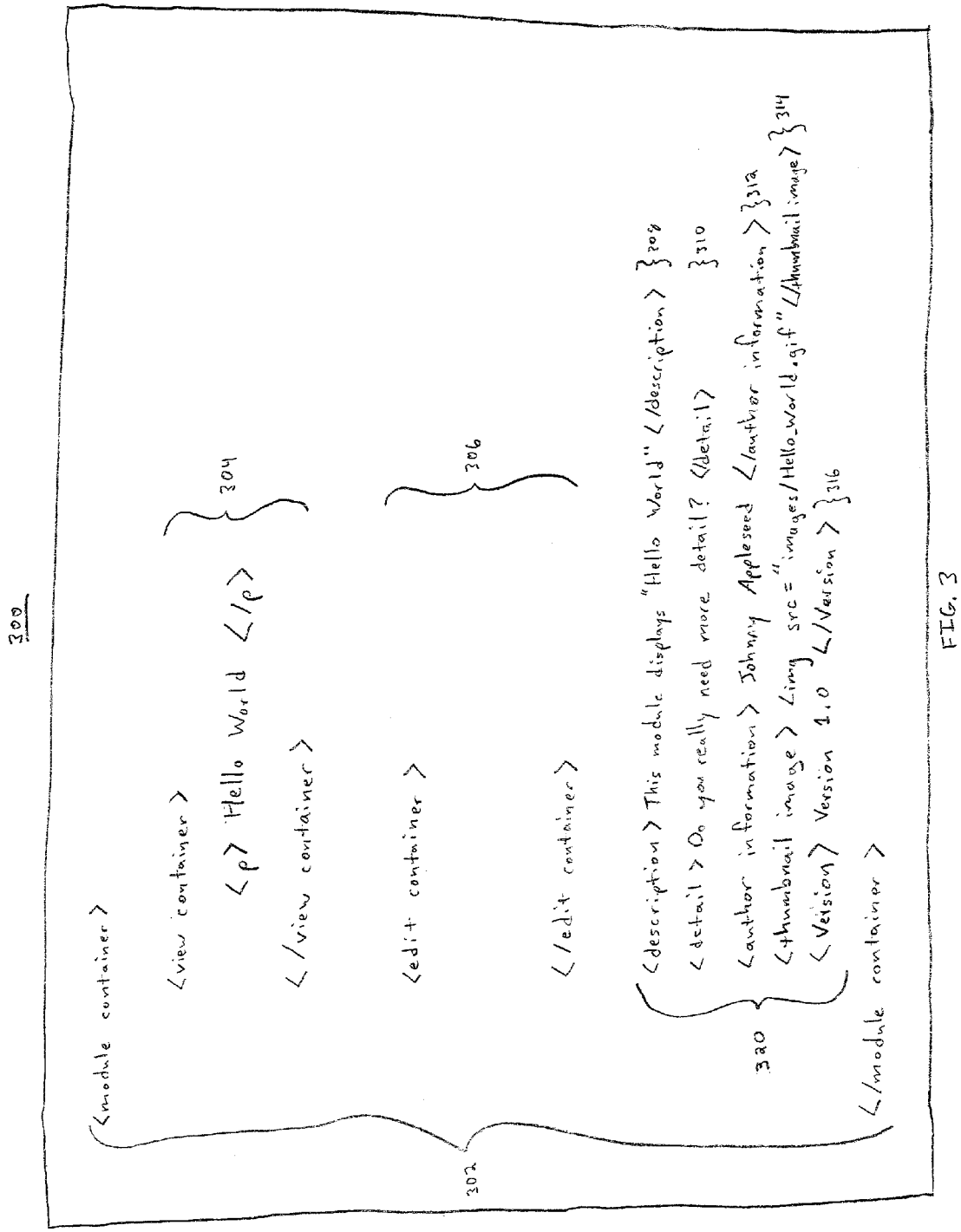
FIG. 3 is a pseudocode representation of an example of a module manifest for packaging one or more modules of web content for reuse.

FIG. 3 is a pseudocode representation 300 of an example of a module manifest for packaging one or more modules of web content for reuse. Generally, a module manifest may be composed in a standards-based markup language such that the module manifest can be rendered in a web browser. However, for the purposes of illustrating the principal elements of a module manifest, the example of a module manifest presented in FIG. 3 is illustrated using pseudocode. The module manifest 300 of FIG. 3 includes a module container element 302 that functions as a containing block for containing a module of web content packaged within the module manifest 300. The module container element 302 also includes several child elements. Most notably, the module container element 302 also includes a view container element 304 and an edit container element 306.

The view container element 304 includes the markup that specifies the content that is viewed (e.g., displayed) when the module of web content contained within the module container element 302 is rendered. For example, as illustrated in FIG. 3, the line "Hello World" will be displayed when the module is rendered.

Figure 1G:
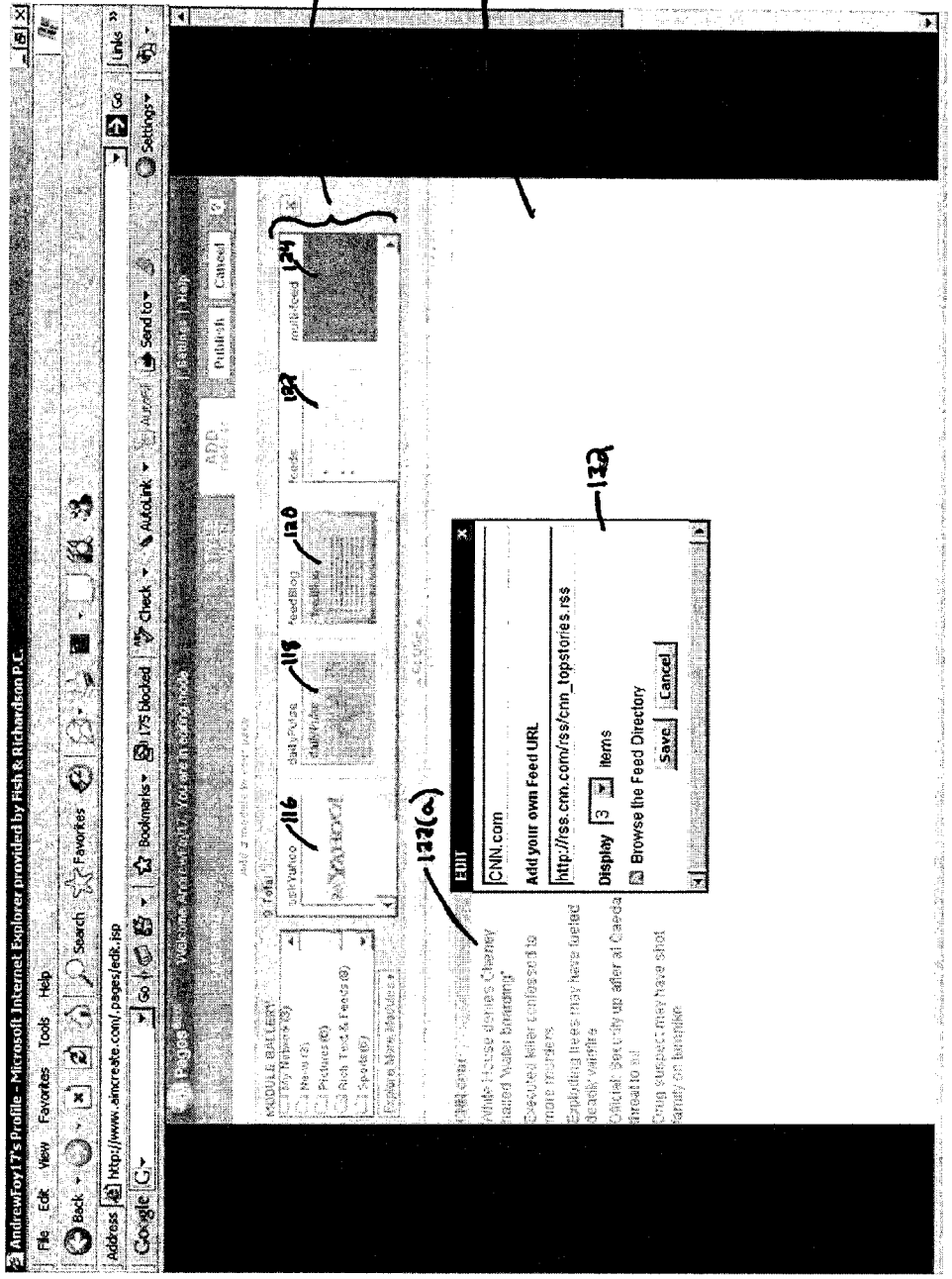
Figure 1H:
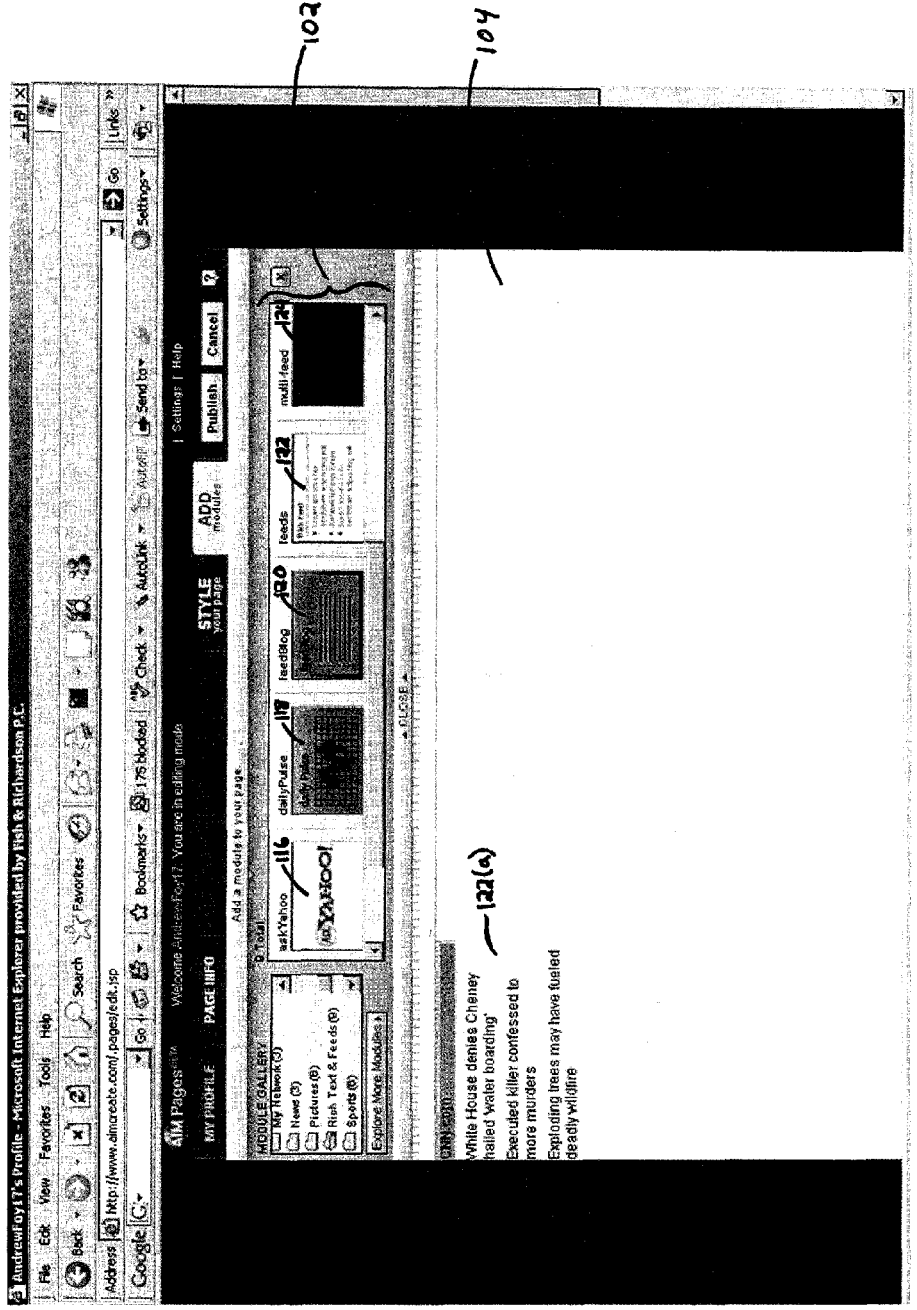

The module container element 302 also includes an edit container element 306 that includes markup, and perhaps associated scripts, styles, and/or meta-data that define an edit interface for the module, such as, for example, the edit interface 132 of FIGS. 1f and 1g, that enables an importer of the module to configure certain aspects or properties of the module. In some implementations, the edit interface may enable an importer of a module to configure aspects or properties of the module before importing the module into a web page. Additionally or alternatively, the edit interface may enable an importer of a module to configure aspects or properties of the module after importing the module into a web page. The edit container element 306 may be optional. Therefore, if a developer does not want to define an edit interface that enables an importer to configure certain aspects or properties of a module, the developer need not do so.

In addition, the module container element 302 also includes a number of additional meta-data child elements 320 that contain information that is descriptive of the module of web content packaged within the module container element 302. In particular, the meta-data child elements 320 include a module description element 308 that includes, for example, a short, user-readable (e.g., not overly technical) description of the module and its functionality. The meta-data child elements 320 also include a detail element 310 that provides a more detailed description of the module's capabilities and requirements, an author information element 312 that provides information about the author of the module, a thumbnail image element 314 that provides a thumbnail image that may be used as a visual representation of the module, and a version element 316 that identifies the version of the module.

The information contained within the meta-data elements 320 may not be needed to instantiate an instance of the module of web content in a web page. Therefore, the information contained within the meta-data elements may not be extracted from the module container element when the module of web content is imported into a web page. Nevertheless, the information contained within the meta-data elements may provide valuable information to a potential importer of the module of web content. When the module manifest is implemented in a standards-based markup language, the information may be accessed by rendering the module manifest in a browser.

As illustrated in FIG. 3, the structural elements used to package a module of web content within the module manifest 300 are the module container element 302, the view container element 304, and the edit container element 306. For this reason, the framework for packaging a module of web content within a module manifest that is illustrated in FIG. 3 may be referred to as a module-view-edit container framework.

A module of web content can be packaged within the module-view-edit container framework simply by adding microformat markup to the markup language (e.g., HTML or XHTML) and associated styles, scripts, and meta-data that define the module of web content. Various different microformat specifications may be used to package modules of web content within a module manifest according to the module-view-edit container framework.

In one implementation, a standards-based format, such as a microformat specification, may be configured to package modules of web content within a module manifest and to reduce the burden required of developers that wish to package modules of arbitrary web content for reuse. Specifically, in this implementation, because microformat specifications are standards-based, developers may develop a pre-existing familiarity with the tags and other markup employed by microformat specifications. Therefore, developers may be able to learn how to use and apply different microformat specifications with relative ease and without much effort. Consequently, using a microformat specification to package modules of web content may reduce the burden required of developers that wish to package modules of web content for reuse.

One particular example of a microformat specification for packaging a module of web content within a module manifest according to the module-view-edit container framework is now described. Nevertheless, it should be appreciated that numerous other microformat specifications also could be used to package modules of web content within a module manifest according to the module-view-edit container framework.

Microformat Specification for Packaging Web Content for Reuse

The example of a microformat specification for packaging a module of web content within a module manifest for reuse according to the module-view-edit container framework described hereinafter extends the functionality of the standard XHTML "class" attribute such that the class attribute can be used to assign new meaning to standard XHTML elements. In particular, the microformat defines new values that may be specified for the standard XHTML class attribute, thereby allowing a developer to assign meaning to the standard XHTML tags. In addition, the microformat specification extends the functionality of the standard XHTML "id" and "rel" attributes beyond standard XHTML as well. Thus, these extensions allow XHTML to be used as semantic markup.

According to the microformat specification, the class attribute is used to define properties of an individual element within a module manifest, to define properties of a module of web content within a module manifest, or to associate an element within a module manifest with a particular module of web content contained within the module manifest.

The module-view-edit container framework packages modules of web content within module manifests by containing modules of web content within module container elements. According to the microformat specification, a module container element is identified by specifying a class attribute for the element as class="module". As such, any standard XHTML element can be used as a module container element simply by specifying a class="module" attribute for the XHTML element. In addition, according to the microformat specification, an element that is used as a module container element also should specify an id attribute that identifies the name of the module of web content packaged within the module container element. For example, in some implementations, the value specified for the id attribute may be a concatenated representation of the module's name. The snippet of markup presented below illustrates an example of how microformat markup according to this microformat specification can be added to an XHTML element to identify the standard XHTML element as a module container element:

```
<body class="module" id="HelloWorld">
...
</body>
```

The addition of the class="module" attribute to the body element identifies the body element as a module container element that contains a module of web content that has been packaged for reuse. Therefore, the markup included within the body element will be recognized as the markup and other items that define the web content as well as additional data associated with the web content. That is, the markup and other items included within the body element will be recognized as defining and/or being associated with a module of web content. In addition, the name of the module contained within the module container element is identified as Hello World by specifying an id="HelloWorld" attribute for the body element. In general, according to the example microformat specification being described, any standard XHTML element, not just a body element, can be identified as functioning as a module container element by specifying a class="module" attribute for the element.

According to the module-view-edit framework, each module container has a view container element that contains the view interface of the module of web content packaged within the module container element. That is to say, a view container element contains the web content that will be displayed to an end user when the module is imported into a web page and rendered in a browser. A view container element for a module's view interface is identified by specifying a class attribute for an element as class="view [id]", where [id] represents the id specified in the module container element that contains the view container element. The snippet of markup presented below illustrates an example of how microformat markup according to this microformat specification can be added to a standard XHTML element to identify the element as a view container element:

```
<body class="module" id="HelloWorld">
    <div class="view HelloWorld">
        <p> Hello World </p>
    </div>
    ...
</body>
```

The addition of the class="view HelloWorld" attribute to the div element identifies the conventional div element as a view container element that contains the module's view interface. Therefore, the markup included within the div element will be recognized as the markup that defines the web content that will be displayed to an end user when the module is rendered in a browser. In this case, the module will display the text "Hello World" when the module is rendered in a browser. In general, more complicated markup can be included within a module's view interface than the static text illustrated in the example presented above. In fact, any valid markup and other data that is capable of being understood by a browser can be packaged within a view container element. For example, hyperlinks, images, audio files, video files, scripts, and styles also may be referenced and packaged within a module's view container. Moreover, modules of web content can include static web content, server-rendered web content, and browser-oriented web content among other formats of web content. In addition, according to the example microformat markup specification being described, any standard XHTML element, not just a body element, can be identified as functioning as a view container element by specifying a class attribute of the element as class="view [id]," so long as the element is a proper child element of the element serving as the module's module container element.

Each module container element can, but need not, include an edit container element for containing a module's edit interface. An edit container element provides an importer of a module of web content with an interface for editing and/or configuring the web content contained within the module. For example, an edit container for a module may include markup and associated scripts, styles, and meta-data that define forms, buttons, or other input mechanisms that enable an importer of the module to edit and/or configure the module either prior to or after importing the module. An edit container element for a module's edit interface is identified by specifying a class attribute of a standard XHTML element as class="edit [id]", where [id] represents the id specified in the module container element that contains the edit container element.

In cases where a module of web content packaged within a module container element in a module manifest is associated with linked elements not contained within the actual module container itself (e.g., linked style sheets or scripts), the class attribute is used to identify and associate such linked elements with the module of web content. This is accomplished by specifying a class attribute for the element as the module name defined by the id attribute specified for the module's module container element.

Module containers, view containers, and edit containers can contain sub-containers referred to as module pieces. For example, module pieces may belong to the head class, the body class, or the foot class and microformat markup can be used to identify the class to which a module piece belongs.

A module piece belonging to the head class typically contains a heading or title for the content. If the content does not have a title or any heading information, a head module piece is not required. In order to identify an element as belonging to the head class, a class attribute for the element can be specified as class="head". According to the microformat specification, a div element or an h3 element should be used for a head module piece. In addition, a module piece belonging to the head class may be contained within a module container element, a view container element, or an edit container element.

A module piece belonging to the body class contains the body of the web content. A module piece belonging to the body class can contain any markup, but it generally should not reuse the module, head, or body classes. In order to identify an element as belonging to the body class, a class attribute for the element can be specified as class="body". A module piece belonging to the body class may be contained within a module container element, a view container element, or an edit container element.

A module piece belonging to the foot class contains a footer for the module. In order to identify an element as belonging to the foot class, a class attribute for the element can be specified as class="foot". A module piece belonging to the foot class may be contained within a module container element, a view container element, or an edit container element. The snippet of markup presented below illustrates an example of how microformat markup according to this microformat specification can be added to standard XHTML elements to identify the elements as belonging to the head, body, and foot classes:

```
<body class="module" id="HelloWorld">
    <div class="view HelloWorld">
        <div class="head">
            <h3> Title: Hello World </h3>
        </div>
        <div class="body">
            <p> Hello World </p>
        </div>
        <div class="foot">
            <p> The End </p>
        </div>
    </div>
    ...
</body>
```

The addition of the class="head" attribute to the div element identifies the div element as belonging to the head class such that the markup included within the div element belonging to the head class will be recognized as markup that is associated with the module's header or title. In this case, the module will display the text "Title: Hello World" in the module's header when the module is rendered. The addition of the class="body" attribute to the div element identifies the div element as belonging to the body class such that the markup included within the div element belonging to the body class will be recognized as the markup that defines the module's body. Finally, the addition of the class="foot" attribute to the div element identifies the div element as belonging to the foot class such that the markup included within the div element belonging to the foot class will be recognized as markup associated with the module's footer. In this case, the module will display the text "The End" in the module's footer when the module is rendered.

The microformat specification also extends the functionality of the class attribute such that it can be used to identify child elements within a module container element that contain meta-data associated with the module of web content packaged within the module container element. A description meta-data element can be identified by specifying a class attribute for a conventional element as class="description". As discussed above, a description meta-data element generally provides a short, user-readable (e.g., not overly technical) description of the module's functionality. A detail meta-data element can be identified by specifying a class attribute for a conventional element as class="detail". As discussed above, a detail meta-data element generally provides a more detailed description of the module's capabilities and requirements. A version meta-data element can be identified by specifying a class attribute for a conventional element as class="detail". As discussed above, a version meta-data element generally identifies the version of the module. A thumbnail meta-data element can be identified by specifying a class attribute for a conventional element as class="thumbnail". As discussed above, a thumbnail meta-data element generally references an image that can be used to provide a visual representation for the module, such as, for example, the visual representations of modules 106, 108, 110, 112, and 114 presented in the menu of modules of web content 102 of FIGS. 1*a*-1*c*. An author meta-data element can be identified by specifying a class attribute for a conventional element as class="author". As discussed above, an author meta-data element may provide information about the author of the module of web content contained within the module container. The snippet of markup presented below illustrates an example of how microformat markup according to this microformat specification can be added to standard XHTML elements to identify child elements within a module container element that contain meta-data associated with a module of web content:

```
<body class="module" id="HelloWorld">
    <div class="view HelloWorld">
        <p> Hello World </p>
    </div>
    <p class="description"> This module displays "Hello World" </p>
    <p class="detail"> If there was more detail, it would go here. </p>
    <p class="version"> Version 1.0 </p>
    <p class="thumbnail"> <img src="hello_world.gif"/> </p>
    <li class="author vcard">
        <a href="mailto:me@aol.com" class="email fn">
            Email me
        </a>
        <a href="http:.//myhomepage.com" class="url">
            My Homepage
        </a>
    </li>
...
</body>
```

The addition of the class="description" attribute to the p element identifies the p element as a description meta-data element such that the markup included within the p element will be recognized as a description of the module. The addition of the class="detail" attribute to the p element identifies the p element as a detail meta-data element such that the markup included within the p element will be recognized as a detailed description of the module. The addition of the class="version" attribute to the p element identifies the p element as a version meta-data element such that the markup included within the p element will be recognized as information associated with the version of the module. The addition of the class="thumbnail" attribute to the p element identifies the p element as a thumbnail meta-data element such that the markup included within the p element will be recognized as a reference to a visual representation of the module. Lastly, the addition of the class="author" attribute to the li element identifies the li element as an author meta-data element such that the markup included within the li element will be recognized as information about the author of the module.

The microformat specification also extends the class attribute such that it may be used to define certain properties of a module of web content and to define certain rules for displaying a module of web content.

For example, an XOXO definition list may be identified as containing the module's properties by specifying a class attribute for the list as class="module-properties". More particularly, since the definition list is an XOXO list, the class attribute for the definition list should be assigned as follows, class="xoxo module-properties". Within a module's module properties definition list, various different classes may be used to declare various different properties for the module. The allowMultiple class can be used to allow the importer of a module to add multiple copies of the module to the importer's page. By default, it generally may be assumed that modules may only have one instance per page. However, the allowMultiple class allows the default to be altered The liquid class can be used to indicate that the module should be expanded to fill all usable space in an importing webpage (i.e., the module has no set width). The onload class is used when a JavaScript function is to run when the module is loaded. The onunload class is used when a JavaScript function is to run when the JavaScript onunload event is fired. The defaultWidth class can be used to specify the default width of the module. Similarly, the minimumWidth class can be used to specify the minimum width within which the module will fit. The following snippet of markup illustrates how the class attribute can be used to specify certain properties of a module of web content and to specify rules for displaying the module of web content:

```
<body class="module" id="HelloWorld">
    <div class="view HelloWorld">
        <p> Hello World </p>
    </div>
    <dl class="xoxo module-properties">
        <dt class="liquid">Liquid width module?</dt>
            <dd>true</dd>
        <dt class="allow-multiple">Allow multiple module instances
        on a single page?</dt>
            <dd>true</dd>
        <dt class="default-width">Module's default width (in
        pixels):</dt>
            <dd>0</dd>
        <dt class="minimum-width">Module's minimum width (in
        pixels):</dt>
            <dd>0</dd>
    </dl>
...
</body>
```

As illustrated in the snippet presented above, the definition list including the module's properties is identified by specifying a class attribute of the definition list as class="module-properties". In addition, the module is configured to expand to fill all usable space when imported into a web page by specifying a class attribute of a dt element as class="liquid" and setting the value to true. Furthermore, the default width of the module is specified as 0 pixels by specifying a class attribute of a dt element as class="default-width" and setting the value to 0 pixels. Similarly, the minimum width of the module is specified as 0 pixels by specifying a class attribute of a dt element as class="minimum-width" and setting the value to 0 pixels.

The microformat specification extends the functionality of the conventional "id" attribute such that it can be used to identify different elements within a module manifest. As discussed above, a module of web content is contained within a module container element and the id attribute is used to identify the name of the module contained within an element for which a class attribute has been specified as class="module".

Modules of web content may be dynamic. When a module of web content needs to include its own cascading style sheets (CSS) or JavaScript files, the CSS or JavaScript files generally, but not always, will be located in the head of the module manifest within which the module is packaged. When a module of web content is extracted from the module manifest and imported into a web page, the CSS or script files in the head of the module manifest generally will be imported into the importing web page unless the id attribute of the script or CSS file is specified as id="manifest," id="tools," or id="defaultstyles." A CSS file for styling a module manifest (when the manifest is rendered, for example, by a browser as described below) may be identified by specifying an id attribute of the CSS file as id="manifest." Similarly, tools provided for module manifest creators that do not need to be replicated across modules may be identified by specifying an id attribute of the tools as id="tools," and default styling for pages or modules may be identified as such by specifying an id attribute of such default styles as id="defaultstyles."

The microformat specification also extends the functionality of the "rel" attribute such that it can be used to identify a relationship between a module of web content and a target document linked to by an element within the module container element. According to the microformat specification, the rel attribute may be used to identify six different types of target documents.

In particular, the rel attribute can be used to identify three types of target documents that provide information about a module of web content. A target document having a rel attribute specified as rel="documentation" provides documentation for the module of web content. A target document having a rel attribute specified as rel="license" provides information concerning the license governing the use of the module of web content. A target document having a rel attribute specified as rel="proxy" identifies a target document as a document that a module importer needs to proxy in order for the module to be able to use asynchronous JavaScript and XML (AJAX).

The rel attribute also can be used to identify three different types of target documents that provide information about the author of the module. A target document having a rel attribute specified as rel="mail" identifies the author's email address or a support address. A target document having a rel attribute specified as rel="author" identifies the author's website. A target document having a rel attribute specified as rel="support" identifies a target document that provides support or contact information for the module of web content.

Because the microformat specification described above is XHTML based, module manifests composed in accordance with the microformat specification can be rendered in a web browser. Therefore, a potential importer of a module of web content can use a web browser to access and view the module manifest within which the module of web content is packaged in order to learn important information about the desired module of web content before instantiating an instance of the module of web content from the module manifest. For example, a potential importer can view the description and detailed information about the module, as well as the license information.

FIG. 4 illustrates an example of a complete module manifest 400 that is created in accordance with the microformat specification described above. As illustrated, the module manifest 400 of FIG. 4 includes, among other elements, a module container element 402, a module view element 404, a version meta-data element 406, a description meta-data element 408, a detail meta-data element 410, an author meta-data element 412, and a link to a license target document 414 that governs the use of the module of web content packaged within the module manifest 400.

The module container element 402 is contained within a body element. The body element is identified as functioning as the module container element 402 by specifying a class attribute of the body element as class="module". In addition, the name of the module packaged within the module container element 402 is identified as supercool by specifying an id attribute of the body element as id="supercool".

The view container element 404 is contained within a div element. The div element is identified as functioning as the view container element 404 for the supercool module by specifying a class attribute of the div element as class="view supercool". The view container 404 includes a head module piece 404(a) and a body module piece 404(b). The head module piece 404(a) is contained within a div element, and the div element is identified as functioning as the head module piece 404(a) by specifying a class attribute of the div element as class="head." Similarly, the body module piece 404(b) also is contained within a div element, and the div element is identified as functioning as the body module piece 404(b) by specifying a class attribute of the div element as class="body".

The version meta-data element 406 is contained within a span element. The span element is identified as functioning as the meta-data version element 406 by specifying a class attribute of the span element as class="version." The description meta-data element 408 is contained within a p element. The p element is identified as functioning as the description meta-data element 408 by specifying a class attribute of the p element as class="description." The detail meta-data element 410 is contained within a conventional p element. The p element is identified as functioning as the detail meta-data element 410 by specifying a class attribute of the p element as class="detail". The author meta-data element 412 is contained within a li element. The li element is identified as functioning as the author information meta-data element 412 by specifying a class attribute of the li element as class="author." Lastly, the link to the license target document 414 is identified as being a link to a license by specifying a rel attribute of the link as rel="license."

FIGS. 5a(1) and 5a(2) illustrate a second example of a complete module manifest for packaging a module of web content for reuse composed in accordance with the microformat specification described above. As illustrated, the module manifest 500 of FIGS. 5a(1) and 5a(2) includes, among other elements, a module container element 502, a module view element 504, a description meta-data element 506, a detail meta-data element 508, a reference to a target license document 510, a reference to a target document that a module importer needs to proxy in order for the module to be able to use AJAX 512, and an author meta-data element 514.

The module container element 502 is contained within a body element. The body element is identified as functioning as the module container element 502 by specifying a class attribute of the body element as class="module." In addition, the name of the module packaged within the module container element 502 is identified as AIMFight by specifying an id attribute of the body element as id="AIMFight."

The view container element 504 is contained within a div element. The div element is identified as functioning as the view container element 504 for the AIMFight module by specifying a class attribute of the dive element as class="view AIMFight." The view container element 504 includes a head module piece 504(a) and a body module piece 504(b). The head module piece 504(a) is contained within an h3 element, and the h3 element is identified as functioning as the head module piece 504(a) by specifying a class attribute of the h3 element as class="head." Similarly, the body module piece 504(b) is contained within a div element, and the div element is identified as functioning as the body module piece 504(b) by specifying a class attribute of the div element as class="body." The module of web content packaged within the view container element 504 is more complicated than the module of web content packaged within the view container element 404 of FIG. 4. For example, the module of web content packaged within the view container element 504 calls a JavaScript function 516.

The description meta-data element 506 is contained within a p element. The p element is identified as functioning as the description meta-data element 506 by specifying a class attribute of the p element as class="description." The detail meta-data element 508 is contained within a p element. The p element is identified as functioning as the detail meta-data element 508 by specifying a class attribute of the p element as class="detail." The reference to the target license document 510 is identified by specifying a rel attribute for the reference as rel="license." The reference to the target document that a module importer needs to proxy in order for the module to be able to use AJAX 512 is identified by specifying a rel attribute for the reference as rel="proxy." The author meta-data element 514 is contained within a ul element. The ul element is identified as functioning as the author meta-data element 514 by specifying a class attribute of the ul element as class="author."

Figure 5B:
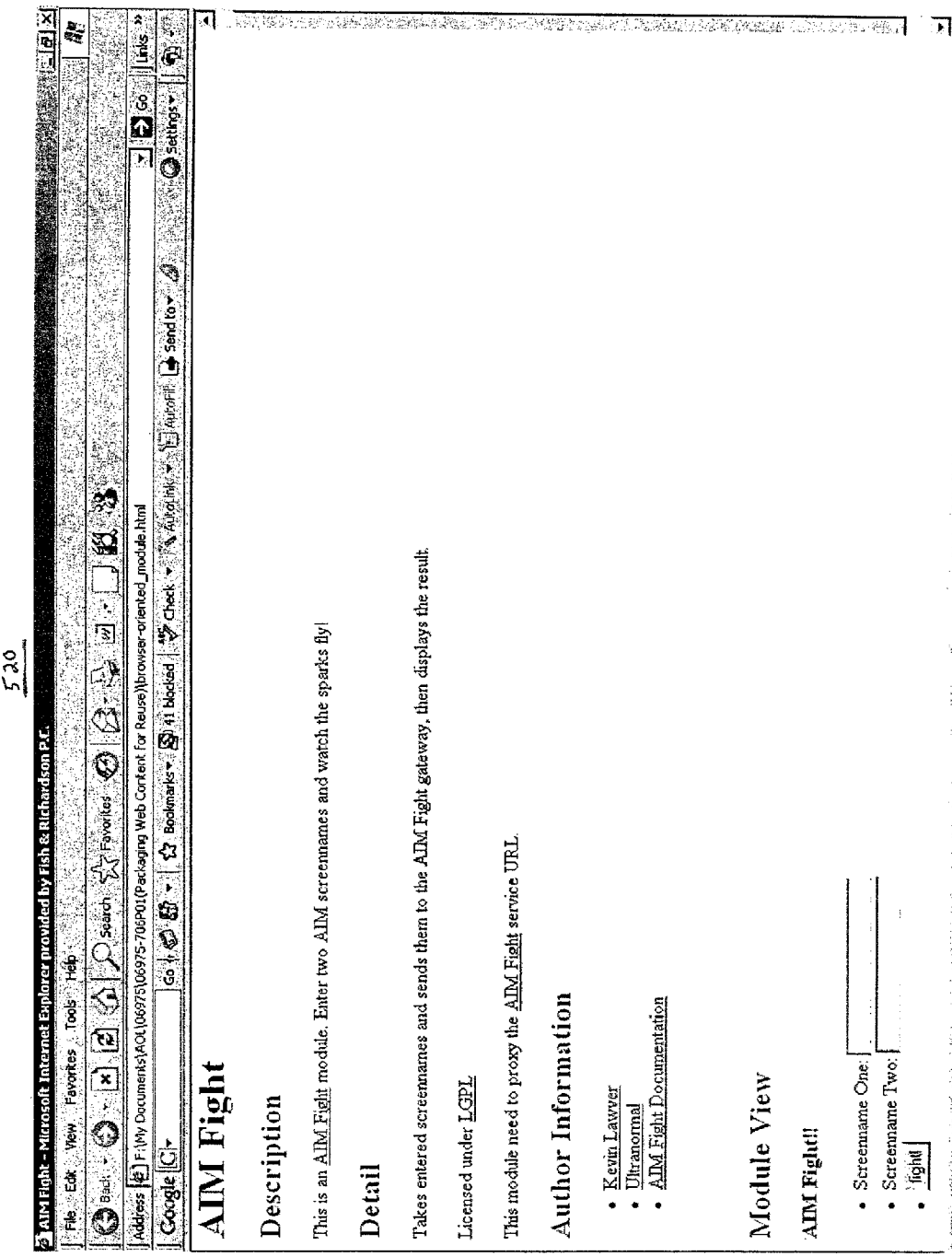
FIG. 5b illustrates a screenshot of the module manifest of FIGS. 5a(1) and 5a(2) when rendered in a browser.

Because the module manifest 500 is composed according to the XHTML-based microformat specification, the module manifest 500 itself can be rendered in a browser. FIG. 5b illustrates a screenshot 520 of the module manifest 500 of FIGS. 5a(1) and 5a(2) when rendered in a browser.

When the module of web content packaged within the module manifest 500 of FIGS. 5a(1) and 5a(2) is imported into a web page, at least the markup included within the view container element 504 of the module manifest 500 and associated styles, scripts, and meta-data may be extracted from the module manifest 500 for importation into the new web page. As such, some of the content and information included within the module manifest 500 of FIGS. 5a(1) and 5a(2) may not be imported into the new web page. FIG. 5c illustrates a screenshot 540 of the web content as it is rendered in a browser after having been imported into the web page. Similarly, FIG. 5d illustrates the markup language source document 560 within which the module of web content has been embedded. As illustrated in FIG. 5d, the markup 562 included within the view container element 504 of the module manifest 500 has been embedded within the markup language source document. In addition, the scripts and styles 564 associated with the markup included within the view container element 504 of the module manifest 500 also have been embedded within the markup language source document 560. As such, the module of web content is capable of being rendered and executed from within the markup language source document.

In some implementations, when a module of web content is imported into a web page, more than (or less than) the markup included within the module's view container element and associated styles, scripts, and meta-data may be extracted from the module's module manifest. That is to say, the importation engine may intelligently identify and extract various different elements from a module manifest when importing a module into a web page. For example, if the module's module container includes an edit container, the markup and associated scripts, styles, and meta-data in the edit container also may be extracted from the module manifest. Furthermore, any other elements, information, or content contained within the module's module container or the module manifest itself also may be extracted and imported. For instance, in some implementations, enough of the information from the module's module container may be extracted and imported into a new web page so that the imported module may be manipulated within, copied, re-imported, or removed from the new web page's markup language source document and/or the new web page's DOM. FIG. 5e shows an example of a markup language source document 570 in such an implementation. In the example document 570, the entire mark-up corresponding to the view container element 504 is imported into the body 566 of the source document 570, while the scripts and other associated resources are imported into the head 568 of the source document. The inclusion of the entire markup corresponding to the view container element 504 may allow for identification and manipulation of the module in the web page.

Furthermore, in some implementations, when a module of web content is imported into a web page, a reference to the module manifest from which the module was extracted also may be imported into the web page. In this manner, any information from the module's module container that was not imported into the web page still may be referenced and/or accessed.

Additionally or alternatively, when a module of web content is imported into a web page, the content's markup and associated scripts, styles, and meta-data may be modified before being imported into the web page and/or additional markup or content may be added to the content's markup and associated scripts, styles, and meta-data before it is imported into the web page. Such modifications and/or additions to the imported web content may expand the functionality of the imported web content. For example, such modifications and/or additions may enable the imported web content to be manipulated within, copied, re-imported, or removed from the web page's markup language source document and/or the web page's DOM.

The described systems, methods, and techniques may be implemented in digital electronic circuitry, computer hardware, firmware, software, or in combinations of these elements. Apparatuses embodying these techniques may include appropriate input and output devices, a computer processor, and a computer program product tangibly embodied in a machine-readable storage device for execution by a programmable processor.

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

A number of implementations have been described. Nevertheless, it will be understood that various modifications may be made. For example, various different microformat specifications could be used to package a module of web content within a module manifest according to the module-view-edit container framework. In addition, while the systems and techniques for packaging web content for reuse generally have been described in the context of XHTML markup and XHTML documents, the disclosed systems and techniques for packaging web content for reuse are equally applicable in the context of HTML markup and HTML markup language. Accordingly, other implementations are within the scope of the following claims.

What is claimed is:

1. A computer-implemented method for unpacking a module of web content that has been packaged for reuse, the method comprising:

receiving a request to import web content that has been packaged within a module manifest document into a source document that defines a web page, the module manifest and source documents being different documents;

accessing the module manifest document in response to receiving the request to import the web content into the web page;

identifying, within the accessed module manifest document, a module container, the module container being a first standard XHTML structural element that has a class attribute that designates the first standard XHTML structural element as the module container and that includes one or more nested children standard XHTML structural elements;

in response to identifying the module container structural element within the accessed module manifest document, parsing one or more of the children structural elements nested inside of the module container structural element;

as a consequence of parsing the children structural elements nested inside of the module container structural element, identifying a child structural element nested inside of the module container structural element within the module manifest document as a view container that includes the web content, the view container being a second standard XHTML structural element that has a class attribute that designates the second standard XHTML structural element as the view container;

as a consequence of having identified the view container structural element nested inside of the module container structural element within the module manifest document, extracting the web content from the view container structural element; and embedding the extracted web content within the source document that defines the web page.

2. The method of claim 1 wherein:

the first standard XHTML structural element has an identification attribute that specifies a name, and identifying the module container includes associating the name specified by the identification attribute of the first standard XHTML structural element with the web content.

3. The method of claim 1 wherein identifying the view container includes determining that the second standard XHTML structural element is the view container based on recognizing that the class attribute of the second standard XHTML structural element designates the second standard XHTML structural element as the view container.

4. The method of claim 1 wherein:

the module manifest document includes other web content in addition to the web content included within the view container structural element, the other web content not being included within the view container structural element;

extracting the web content from the view container structural element, includes extracting the web content from the view container structural element without extracting at least some of the other web content included within the module manifest document but not within the view container structural element; and the method further comprises rendering, in a web browser, the web content in the module manifest document, including the web content included within the view container structural element and the other web content included within the module manifest document but not within the view container structural element.

5. The method of claim 1 wherein identifying the module container includes determining that the first standard XHTML structural element is the module container based on recognizing that the class attribute of the first standard XHTML structural element designates the first standard XHTML structural element as the module container.

6. A computer-implemented method for using a microformat specification that extends the meaning of standard XHTML elements to package web content for reuse in an XHTML-based module manifest document the method comprising:

designating a first markup element within the module manifest document as a module container that serves as a containing block for a module of web content by assigning a class attribute of the first markup element a value that, according to the microformat specification, identifies the first markup element as belonging to a module container class and by assigning an identification attribute of the first markup element a value that associates the module of web content with a name;

designating a second markup element that is nested inside of the first markup element within the module manifest as a view container by assigning a class attribute of the markup element a value that, according to the microformat specification, identifies the markup element as belonging to a view container class and references the name associated with the module of web content; and enclosing the web content within the view container.

7. The method of claim 6 further comprising designating a third markup element nested inside of the module container as a description meta-data element for containing a description of the module of web content by assigning a class attribute of the third markup element a value that, according to the microformat specification, identifies the third markup element as the description meta-data element.

8. The method of claim 7 further comprising designating a fourth markup element nested inside of the module container as a detail meta-data element for containing another description of the module of web content that is more detailed than the description of the module of web content contained within the description meta-data element by assigning a class attribute of the fourth markup element a value that, according to the microformat specification, identifies the fourth markup element as the detail meta-data element.

9. The method of claim 6 further comprising designating a third markup element nested inside of the module container as an author meta-data element for containing information about an author of the module of web content by assigning a class attribute of the third markup element a value that, according to the microformat specification, identifies the third markup element as the author meta-data element.

10. The method of claim 6 further comprising designating a third markup element nested inside of the module container as a thumbnail meta-data element for containing a reference to a visual representation associated with the module of web content by assigning a class attribute of the third markup element a value that, according to the microformat specification, identifies the third markup element as the thumbnail meta-data element.

11. The method of claim 6 further comprising designating a third markup element nested inside the module container as a version meta-data element for containing information related to a version of the module of web content by assigning a class attribute of the third markup element a value that, according to the microformat specification, identifies the third markup element as the version meta-data element.

12. The method of claim 6 further comprising designating a target document referenced by a third markup element that is nested inside the module container as a document that provides documentation about the module of web content by associating an attribute with the target document that, according to the microformat specification, identifies the target document as the document that provides documentation about the web content.

13. The method of claim 6 further comprising designating a target document referenced by a third markup element that is nested inside the module container as a document that provides information about a license associated with the module of web content by associating an attribute with the target document that, according to the microformat specification, identifies the target document as the document that provides information about the license associated with the module of web content.

14. The method of claim 6 further comprising designating a target document referenced by a third markup element that is nested inside the module container as a document that an importer of the module of web content needs to proxy by associating an attribute with the target document that, according to the microformat specification, identifies the target document as the document that the importer needs to proxy.

15. The method of claim 6 further comprising designating a third markup element nested inside of the module container as a module properties list for defining at least one property of the module of web content by assigning a class attribute of the third markup element a value that, according to the microformat specification, identifies the third markup element as the module properties meta-data element.

16. The method Of claim 6 further comprising designating a third markup element enclosed within the module container as an edit container for defining an edit interface that enables a user to configure the module of web content by assigning a class attribute of the third markup element a value that, according to the microformat specification, identifies the third markup element as belonging to an edit container class.

17. A computer-readable storage medium storing instructions for unpacking a module of web content that has been packaged for reuse, wherein the instructions, when executed by a processor, cause the processor to:
receive a request to import web content that has been packaged within a module manifest document into a source document that defines a web page, the module manifest and source documents being different documents;
access the module manifest document in response to receiving the request to import the web content into the web page;
identify, within the accessed module manifest document, a module container, the module container being a first standard XHTML structural element that has a class attribute that designates the first standard XHTML structural element as the module container and that includes one or more nested children standard XHTML structural elements;
in response to identifying the module container structural element within the accessed module manifest document, parse one or more of the children structural elements nested inside of the module container structural element;
as a consequence of parsing the children structural elements nested inside of the module container structural element, identify a child structural element nested inside of the module container structural element within the module manifest document as a view container that includes the web content, the view container being a second standard XHTML structural element that has a class attribute that designates the second standard XHTML structural element as the view container;
as a consequence of having identified the view container structural element nested inside of the module container structural element within the module manifest document, extract the web content from the view container structural element; and
embed the extracted web content within the source document that defines the web page.

18. The computer-readable storage medium of claim 17 wherein:
the module manifest document includes other web content in addition to the web content included within the view container structural element, the other web content not being included within the view container structural element;
the instructions that, when executed by a processor, cause the processor to extract the web content from the view container structural element, include instructions that, when executed by a processor, cause the processor to extract the web content from the view container structural element without extracting at least some of the other web content included within the module manifest document but not within the view container structural element; and
the instructions further include instructions that, when executed by a processor, cause the processor to render, in a web browser, the web content in the module manifest document, including the web content included within the view container structural element and the other web content included within the module manifest document but not within the view container structural element.

19. A computer-implemented method comprising:
accessing, from one or more computer readable storage devices, multiple XHTML-based module manifest documents, each of the XHTML-based module manifest documents including a module of web content that has been packaged within the XHTML-based module manifest document;
causing at least some of the modules of web content packaged within the accessed XHTML-based module manifest documents to be rendered concurrently on a display of a computing system;
receiving an indication of a request from a user of the computing system for more information about a particular one of the modules of web content rendered concurrently on the display of the computing system;
in response to receiving the indication of the request from the user of the computing system for more information about the particular module of web content:
accessing the particular XHTML-based module manifest document within which the particular module of web content is packaged, the particular XHTML-based module manifest document within which the particular module of web content is packaged including:

a first standard XHTML structural element that has a class attribute that designates the first standard XHTML structural element as a module container that includes metadata about the module of web content and markup language code that defines the particular module of web content, a second standard XHTML structural element that is nested inside of the first standard XHTML structural element and that has a class attribute that designates the second standard XHTML structural element as a view container that includes the markup language code that defines the particular module of web content, at least one additional standard XHTML structural element that is nested inside of the first standard XHTML structural element but that is not nested inside of the second standard XHTML structural element and that has a class attribute that designates the additional standard XHTML element as a metadata element that includes metadata about the particular module of web content, a reference to a first style sheet file that has an identification attribute that designates the first style sheet file as applying to styling the particular XHTML-based module manifest document, the reference to the first style sheet file not being nested inside of the first standard XHTML element, a reference to a second style sheet file, the reference to the second style sheet file not being nested inside of the first standard XHTML element, and a reference to a script called by the particular module of web content, the reference to the script not being nested inside of the first standard XHTML element, enabling rendering, on the display of the computing system and with a browser running on the computing system, of the particular XHTML-based module manifest document such that:

the rendered particular XHTML-based module manifest is styled according to the first style sheet file based on the reference to the first style sheet file within the particular XHTML-based module manifest document having the identification attribute that designates the first style sheet file as applying to styling the particular XHTML-based module manifest document, and both the particular module of web content and the metadata about the particular module of web content included within the additional standard XHTML structural element nested inside of the first standard XHTML structural element within the particular XHTML-based module manifest document are rendered concurrently on the display of the computing system;

receiving a request to import the particular module of web content into a source document that defines a web page, the particular XHTML-based module manifest and source documents being different documents;

in response to receiving the request to import the particular module of web content into the source document that defines the web page:

parsing the particular XHTML-based module manifest document within which the particular module of web content is packaged for the module container, based on results of parsing the particular XHTML-based module manifest document within which the particular module of web content is packaged for the module container, identifying the first standard XHTML structural element as the module container based on the class attribute of the first standard XHTML structural element that designates the first standard XHTML structural element as the module container, as a consequence of having identified the first standard XHTML structural element as the module container, parsing the first standard XHTML structural element for the view container, based on results of parsing the first standard XHTML structural element for the view container, identifying the second standard XHTML structural element as the view container based on the class attribute that designates the second standard XHTML structural element as the view container, as a consequence of having identified the second standard XHTML structural element as the view container, extracting the markup language code that defines the particular module of web content from the second standard XHTML structural element, extracting the reference to the second style sheet file from the particular XHTML-based module manifest document, and extracting the reference to the script called by the particular module of web content from the XHTML-based module manifest document; and embedding the extracted markup language code that defines the particular module of web content, the extracted reference to the second style sheet file, and the extracted reference to the script called by the particular module of web content within the source document that defines the web page.

20. The method of claim 19 wherein:
extracting the markup language code that defines the particular module of web content from the second standard XHTML structural element, extracting the reference to the second style sheet file from the particular XHTML-based module manifest document, and extracting the reference to the script called by the particular module of web content from the XHTML-based module manifest document includes from the second standard XHTML structural element, extracting the reference to the second style sheet file from the particular XHTML-based module manifest document, and extracting the reference to the script called by the particular module of web content from the XHTML-based module manifest document without extracting content from the at least one additional standard XHTML structural element that is nested inside of the first standard XHTML structural element but that is not nested inside of the second standard XHTML structural element.

21. The method of claim 19 wherein:
the at least one additional standard XHTML structural element that is nested inside of the first standard XHTML structural element but that is not nested inside of the second standard XHTML structural element and that has a class attribute that designates the additional standard XHTML element as a metadata element that includes metadata about the particular module of web content is a standard XHTML structural element that has a class attribute designating the additional standard XHTML structural element as a description meta-data element and that includes a textual description of the module of web content; and enabling rendering of the particular XHTML-based module manifest document includes enabling rendering of the textual description of the module of web content included within the additional standard XHTML structural element concurrently with the rendering of the particular module of web content.

22. The method of claim 19 wherein:

the at least one additional standard XHTML structural element that is nested inside of the first standard XHTML structural element but that is not nested inside of the second standard XHTML structural element and that has a class attribute that designates the additional standard XHTML element as a metadata element that includes metadata about the particular module of web content is a standard XHTML structural element that has a class attribute designating the additional standard XHTML structural element as an author meta-data element and that includes a textual indication of the author of the module of web content; and enabling rendering of the particular XHTML-based module manifest document includes enabling rendering of the textual indication of the author of the module of web content included within the additional standard XHTML structural element concurrently with the rendering of the particular module of web content.

23. The method of claim 19 wherein:

the at least one additional standard XHTML structural element that is nested inside of the first standard XHTML structural element but that is not nested inside of the second standard XHTML structural element and that has a class attribute that designates the additional standard XHTML element as a metadata element that includes metadata about the particular module of web content is a standard XHTML structural element that has a class attribute designating the additional standard XHTML structural element as a thumbnail meta-data element and that includes a reference to a visual representation associated with the module of web content; and enabling rendering of the particular XHTML-based module manifest document includes enabling rendering of the visual representation associated with the module of web content for which the reference is included within the additional standard XHTML structural element concurrently with the rendering of the particular module of web content.

24. The method of claim 19 wherein:

the at least one additional standard XHTML structural element that is nested inside of the first standard XHTML structural element but that is not nested inside of the second standard XHTML structural element and that has a class attribute that designates the additional standard XHTML element as a metadata element that includes metadata about the particular module of web content includes a standard XHTML structural element that has a class attribute designating the additional standard XHTML structural element as a proxy meta-data element and that includes an attribute that designates a target document as a document that an importer of the particular module of web content needs to proxy.

* * * * *